US008009082B2

(12) United States Patent
Shinoda et al.

(10) Patent No.: US 8,009,082 B2
(45) Date of Patent: Aug. 30, 2011

(54) MOBILE RADAR AND PLANAR ANTENNA

(75) Inventors: Hiroshi Shinoda, Kodaira (JP);
Mitsutoshi Morinaga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 318 days.

(21) Appl. No.: 12/422,276

(22) Filed: Apr. 12, 2009

(65) Prior Publication Data
US 2009/0267822 A1 Oct. 29, 2009

(30) Foreign Application Priority Data

Apr. 28, 2008 (JP) ................................. 2008-117019

(51) Int. Cl.
G01S 13/00 (2006.01)
H01Q 21/08 (2006.01)
(52) U.S. Cl. .......... 342/70; 342/147; 342/153; 342/154; 343/824
(58) Field of Classification Search .............. 342/70–72, 342/147, 153, 154, 157, 158; 343/824
See application file for complete search history.

(56) References Cited

U.S. PATENT DOCUMENTS

| 3,778,823 | A | * | 12/1973 | Sato et al. ....................... 342/72 |
| 3,858,205 | A | * | 12/1974 | Ross .............................. 342/21 |
| 5,506,589 | A | * | 4/1996 | Quan et al. ..................... 342/373 |
| 5,598,163 | A | * | 1/1997 | Cornic et al. ................... 342/70 |
| 5,781,157 | A | * | 7/1998 | Laird ............................ 342/379 |
| 5,784,022 | A | * | 7/1998 | Kupfer ........................... 342/80 |
| 6,653,973 | B2 | * | 11/2003 | Yu ................................. 342/90 |
| 6,750,810 | B2 | * | 6/2004 | Shinoda et al. ................ 342/149 |
| 6,853,329 | B2 | * | 2/2005 | Shinoda et al. ................ 342/149 |
| 6,873,250 | B2 | * | 3/2005 | Viana et al. .................... 340/435 |
| 6,933,881 | B2 | * | 8/2005 | Shinoda et al. ................... 342/70 |
| 7,050,019 | B1 | * | 5/2006 | Jacomb-Hood et al. ....... 343/893 |
| 7,081,847 | B2 | * | 7/2006 | Ziller et al. .................... 342/70 |
| 7,132,976 | B2 | * | 11/2006 | Shinoda et al. ................. 342/70 |
| 7,151,482 | B2 | * | 12/2006 | Natsume et al. ............... 342/147 |
| 7,362,259 | B2 | * | 4/2008 | Gottwald ........................ 342/70 |
| 7,403,172 | B2 | * | 7/2008 | Cheng ........................... 343/853 |
| 7,408,500 | B2 | * | 8/2008 | Shinoda et al. ................. 342/70 |

(Continued)

FOREIGN PATENT DOCUMENTS

JP 09-101361 A 4/1997

(Continued)

OTHER PUBLICATIONS

Nobuyoshi Kikuma, "Adaptive Signal Processing Utilizing Array Antennas", Digital Mobile Communications Series, Kagaku Gijutsu Shuppan Inc., p. 174, (1998).

*Primary Examiner* — Thomas H Tarcza
*Assistant Examiner* — Peter Bythrow
(74) *Attorney, Agent, or Firm* — Miles & Stockbridge P.C.

(57) ABSTRACT

In a conventional automotive radar, a return occurs in a phase difference characteristic necessary for a super-resolution method, resulting in an increase of a detection error, or an extremely narrowed azimuth detection range. A transmitting array antenna, and receiving array antennas are composed of antenna elements respectively, and aligned in a horizontal direction. The weighting of receiving sensitivities of the antenna elements of the receiving array antenna 1 is A1, A2, A3, and A4, which are monotonically decreased from an inner side toward an outer side as represented by A1≧A2≧A3≧A4. On the other hand, the receiving array antenna 3 is symmetrical with the receiving array antenna with respect to the receiving array antenna 1.

20 Claims, 21 Drawing Sheets

U.S. PATENT DOCUMENTS

| | | | |
|---|---|---|---|
| 7,423,578 B1 * | 9/2008 | Tietjen | 342/59 |
| 7,486,223 B2 * | 2/2009 | Shima | 342/70 |
| 7,663,537 B2 * | 2/2010 | Suzuki et al. | 342/133 |
| 7,737,879 B2 * | 6/2010 | Tietjen et al. | 342/59 |
| 2004/0183719 A1 * | 9/2004 | Natsume et al. | 342/147 |
| 2007/0001897 A1 * | 1/2007 | Alland | 342/70 |

FOREIGN PATENT DOCUMENTS

| | | |
|---|---|---|
| JP | 2003-270316 A | 9/2003 |
| JP | 2004-245602 A | 9/2004 |
| JP | 2007-240313 A | 9/2007 |

\* cited by examiner $X_{12} = S_1 \times \exp(i\phi_A) - S_2$
$X_{23} = S_2 \times \exp(i\phi_A) - S_3$ $Y = X_{12} \times \exp(i\phi_B) - X_{23}$

MOBILE RADAR AND PLANAR ANTENNA

CLAIM OF PRIORITY

The present application claims priority from Japanese Patent Application JP 2008-117019 filed on Apr. 28, 2008, the content of which is hereby incorporated by reference into this application.

FIELD OF THE INVENTION

The present invention relates to a mobile radar and a planar antenna, and more particularly to a mobile radar which is mounted on a mobile object such as a vehicle, and adapted to detect an azimuth orientation of an obstacle, a relative distance to the mobile object, a relative velocity, or the like, and a planar antenna for the radar.

BACKGROUND OF THE INVENTION

JP-A-09-101361 discloses an FM-CW radar that enables plural targets to be detected in the mobile radar mounted on an automobile or the like.

Also, JP-A-2007-240313 discloses an azimuth angle detecting device that executes a space average detecting process when a velocity of a subject vehicle is equal to or lower than a threshold value, and detects the azimuth angle of each target that generates a reflected wave of a radar wave received by a receiving antenna.

Further, Kagaku Gijutsu Shuppan Inc., Nobuyoshi Kikuma, "Adaptive signal processing Utilizing array antennas", 1998, p. 174 (herein after "Kikuma"), and JP-A-2003-270316 disclose a super-resolution method that detects an azimuth orientation of an obstacle by using an antenna radiation pattern combining the directivities together after the weighting of the amplitude/phase of the respective receiving antennas has been controlled with the use of plural receiving antennas.

SUMMARY OF THE INVENTION

A millimeter wave radar is an all-weather radar that is unlikely to be affected by weather conditions such as rain, fog, or snow, dust, or noise, and has been developed by domestic and international manufacturers as an automotive radar optimum to an adaptive cruise control (ACC) or the like. In recent years, the respective radar manufacturers have actively being developed close range radars have been actively developed in addition to long range radars applied to the ACC system or a Stop & Go system. In the automotive application applying the close range radar, in addition to the above systems, there are a pre-crush system that detects collision in advance, and starts a brake and an air bag for protecting a driver, a parking aid system, a lane change decision aid systems (LCDAS), and so on, which are expected to generate a large market. The high performance, cost reduction, and downsizing of the automotive radar together with the above diversified applications, and high precision in the azimuth angle detection of the obstacle is one of challenging problems.

The azimuth angle detecting system of the obstacle is generally a monopulse system, a mechanical scanning system, an electronic beam scanning system, and so on. JP-A-09-101361 discloses the technique related thereto. However, in recent years, a demand for the radar performance has increased on the market, and attention has been paid to a super-resolution method represented by MUSIC and ESPRIT superior in separation and resolution performance. JP-A-2003-270316 and the "Kikuma" disclose the technique related to the super-resolution method.

A principle of the super-resolution method will be described in brief with reference to FIG. 16. In the super-resolution method, plural (M) receiving antennas 61, 62, ... 6M are used, and a radio wave transmitted from a transmitting antenna is reflected to an obstacle, and received as receive signals by the respective receiving antennas. The receive signal waves Rx from the respective receiving antenna are subjected to weighting control of amplitude/phase by a weighting unit 71, 72, ... 7M, directivity synthesis is executed by a synthesizing unit 8 to generate an antenna radiation pattern, and the azimuth orientation of the obstacle is detected by using the antenna radiation pattern. (M−1) nulls that enable scanning independently can be generated by conducting directivity synthesis.

FIG. 17 is an example of the antenna radiation pattern obtained by the super-resolution method in the case of using three receiving antennas. Azimuth angle directions (hereinafter referred to as "null points") in which the antenna gain is reduced can be formed at θ1 and θ2, respectively. The azimuth orientation of the obstacle is specified by using a fact that the receive signal level becomes zero when the null is scanned, and directed to the azimuth angle of the obstacle. Because the null has a precipitous characteristic with respect to the azimuth angle as compared with the beam, the higher azimuth resolution is obtained. That is, when two obstacles are in the directions of θ1 and θ2, respectively, the receive signal level is zero. Conversely, since the receive signal level is not zero in other cases, the azimuth orientation of the obstacle can be specified. As described above, according to the super-resolution method, (M−1) obstacles can be separated by M receiving antennas to detect the azimuth orientation.

Incidentally, there occurs a case in which plural vehicles having a relatively identical velocity exist in front of a subject vehicle, or the like, depending on the travel condition of the vehicle. In the radar using a monopulse system specifying the obstacle azimuth orientation on the basis of a phase difference of the receive signals from two receiving antennas, there occurs a case in which the plural vehicles cannot be detected with precise in the above travel condition.

Referring to FIG. 18, a description will be given of a case in which precise detection due to the radar using the monopulse system is difficult. In order to measure the distance to the vehicle and the velocity thereof, the radar modulating system uses a two-frequency CW system (a similar case is also discussed in JP-A-2007-240313). A subject vehicle 33 travels with a radar 34 mounted thereon, and two vehicles 35 and 36 in front of the subject vehicle 33 are identical in the relative velocity with the subject vehicle 33. Because the Doppler shift frequencies of the returned receive signals reflected by the forward vehicles 35 and 36 have the same value, the frequency peaks of both the vehicles 35 and 36 are overlapped with each other when observing the frequency spectrum. In this case, because the detected receive signals are a synthetic wave of a reflected wave by the vehicle 35 and a reflected wave by the vehicle 36, a measured value is output to a position of a center vicinity 39 of those vehicles 35 and 36 in the monopulse system in principle.

On the other hand, in the radar using the super-resolution method, positions 37 and 38 can be detected by using plural nulls, separately, even when there are plural vehicles having the same relative velocity.

According to the super-resolution method, the target can be precisely detected even in a case where there are obstacles at right and left sides such as ETC gates, there are plural multipaths within a tunnel or the like, and so on, without being limited to a case where plural vehicles having the same relative velocity exit.

However, because phase information is used in the super-resolution method, there arises a problem of a phase return which will be described below. In this example, a description will focus on a phase difference ($\Delta\phi$) between the receiving antennas 61 and 62 shown in FIG. 16.

Referring to FIG. 16, when a reflected wave from an obstacle existing at an angle of $\theta$ with respect to a direction normal to the antenna surface is received by the two receiving antennas 61 and 62, the phase difference ($\Delta\phi$) occurs between the respective receiving antennas 61 and 62, which is represented by the following Expression (1). In this example, D represents a distance between the receiving antennas, and $\lambda$ is a free space wavelength.

$$\Delta\theta = (2\pi/\lambda)D \sin\theta \tag{1}$$

FIG. 19 shows a relationship between an arrival azimuth angle $\theta$ and the phase difference $\Delta\phi$ of the signal. In this example, it is assumed that an SN ratio of the level enabling the reflected wave from the obstacle to be recognized as the receive signal is taken in an azimuth angle range of $-\theta s \leq \theta \leq +\theta s$. Since the radar mounted position is at a front face of the vehicle, $\theta s \leq 90$ [degrees] is met. However, strictly, the angle is determined according to the respective beam widths of the transmitting antenna and the receiving antenna, the transmit output, the gain of a receiver, the noise level, the scatter cross section of the obstacle, and so on. When the phase difference $\Delta\phi$ exceeds $\pm 180$ degrees, return occurs. However, the arrival azimuth angle of the signal can be uniquely specified in a range of $-\theta d \leq \theta \leq +\theta d$. In this case, the azimuth angle at which return starts to occur can approach $\theta s$ by reducing the distance D between the receiving antennas, and the azimuth angle detection angle can be readily widened. Alternatively, when plural receiving antennas are configured by one receiving antenna group in plural arrayed receiving antennas, and groups are selected so that parts of groups are overlapped with each other, the distance between the receiving antenna groups can be equivalently reduced.

However, in the case of a long range radar requiring the high gain and the narrow beam width, the return occurs due to an increase in the distance D between the receiving antennas, which is attributable to an increase in the receiving antenna area as shown in FIG. 20. When the return occurs, there arises such a problem that plural azimuth orientation values $\theta$ are caused to correspond to one phase difference value $\Delta\phi$, resulting in an increase of detector errors, or the azimuth angle detection range being extremely narrowed. Also, the above problem is solved by the above-described antenna grouping, however the number of receiving antennas is naturally increased, and an increase in the costs due to an increase in the number of receiver circuit elements is not avoidable.

The present invention has been made to solve the problem with the monopulse system or the conventional super-resolution method described above.

An object of the present invention is to provide a mobile radar and a planar antenna for the radar that realizes a wide azimuth angle detection range while narrowing a beam angle with the reduced number of parts, and has an azimuth detection performance with precision and high resolution performance.

A representative example of the present invention will be described below. That is, the mobile radar according to the present invention includes a planar antenna and a transmitter-receiver unit. The planar antenna includes at least one transmitting array antenna and three or more receiving array antennas, and the three or more receiving array antennas are aligned in a horizontal direction. The number of antenna elements of the receiving array antennas positioned at both outer ends thereof which are aligned in the horizontal direction is larger than the number of antenna elements of the other at least one receiving array antenna positioned at inner side in the horizontal direction. An outermost antenna element is smaller than an innermost antenna element in the weighting of the receiving sensitivity of the receiving antennas located at both outer ends thereof in the horizontal direction. Respective receive signals obtained by reflecting a radio wave transmitted from the transmitting array antenna by at least one obstacle and received by the respective receiving array antennas are synthesized in directivity after being weighted in the amplitude/phase, and an azimuth angle being null or low sensitivity is scanned to specify azimuth orientation of the at least one obstacle.

According to the present invention, even if the number of antenna elements is increased for narrowing the beam angle, a short distance between the receiving antennas can be maintained, and a return of the phase difference of the receive signal can be reduced. Also, since the phase characteristics of the innermost antenna element and the outmost antenna element are inverted, the return of the phase difference can be further suppressed. As a result, a wide azimuth detection range can be realized while narrowing a beam angle with the reduced number of parts, and azimuth detection with precision and high resolution performance is enabled.

DETAILED DESCRIPTION OF THE PREFERRED EMBODIMENTS

A mobile radar according to a representative embodiment of the present invention includes at least one transmitting array antenna, and three or more receiving array antennas, which are mounted in a mobile such as a vehicle. A radio wave transmitted from the transmitting array antenna is reflected by at least one obstacle and received by the receiving array antennas as a receive signal. The receive array antennas are synthesized in directivity after being weighted in the amplitude/phase, and an azimuth angle being null or having low sensitivity is scanned to specify the azimuth orientation of the at least one obstacle. The receiving array antennas are aligned in a horizontal direction. The number of antenna elements of the receiving array antennas at both outer ends thereof which are aligned in the horizontal direction is larger than the number of antenna elements of the other receiving array antennas which are aligned in the horizontal direction. An outermost antenna element is smaller than an innermost antenna element in the weighting of the receiving sensitivity of the receiving array antenna at the both outer ends in the horizontal direction.

With the above configuration, even if the number of antenna elements is increased for narrowing the beam angle, a short distance between the receiving antennas can be maintained, and a return of the phase difference of the receive signal can be reduced. Also, since the phase characteristics of the innermost antenna element and the outmost antenna element are inverted, the return of the phase difference can be further suppressed. As a result, a wide azimuth detection range can be realized while narrowing a beam angle with the reduced number of parts, and azimuth detection with precision and high resolution performance is enabled.

Also, a mobile radar according to another embodiment is configured so that the receiving array antennas are aligned in the horizontal direction, the weighting of receiving sensitivities of the receiving array antennas at both outer ends thereof in the horizontal direction is monotonically decreased from an innermost antenna element to an outermost antenna element. As a result, the return of the phase difference can be effectively suppressed.

Further, a mobile radar according to still another embodiment of the present invention is configured so that the weighting of the receiving sensitivity of the receiving array antennas is conducted by an electric power distributor composed of a transmission line on the same dielectric substrate as the receiving array antenna. As a result, since the mobile radar can be processed by the technique of a printed circuit board, the costs can be further reduced.

Hereinafter, a mobile radar according to embodiments of the present invention will be described in detail with reference to the accompanying drawings.

First Embodiment

Figure 1:
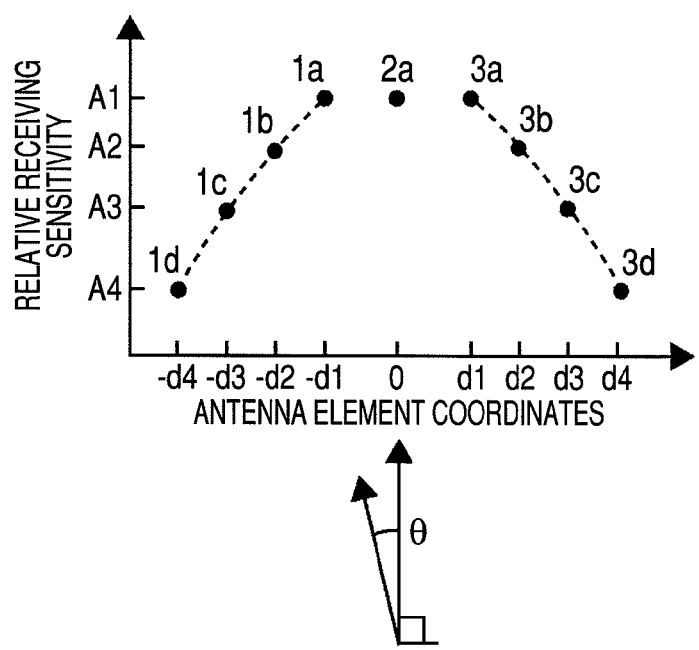
FIG. 1 is a configuration diagram showing the concept of a mobile radar according to a first embodiment of the present invention.
Figure 1:
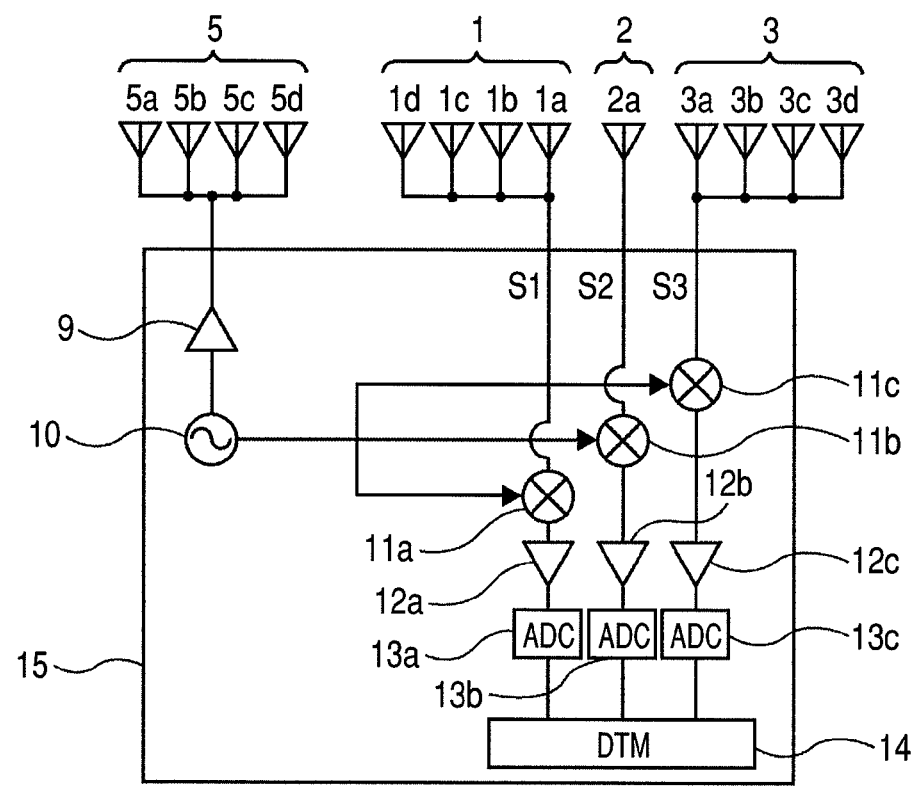

First, a first embodiment of the present invention will be described with reference to FIGS. 1 to 6. In FIG. 1, (A) is a conceptual diagram showing the configuration of a mobile radar according to the first embodiment. (B) of FIG. 1 is a diagram showing a relationship between antenna element coordinates and a relative receiving sensitivity of the mobile radar shown in (A) of FIG. 1.

In (A) of FIG. 1, the automotive radar includes a planar antenna having one transmitting array antenna 5 and three receiving array antennas 1, 2, and 3, and a transmitter-receiver unit 15. A radio wave transmitted from the transmitting array antenna is reflected by at least one obstacle and received by the receiving array antennas 1, 2, and 3, as a receive signal. The receiving array antennas 1, 2, and 3 of the planar antenna are aligned in a horizontal direction. Symbol θ represents an azimuth angle.

A millimeter wave signal generated by an oscillator 10 of the transmitter-receiver unit 15 is converted into a transmit signal that has been modulated in frequency through a two-frequency CW system, an FMCW system, or the like, passes through an electric power amplifier 9, and is then added to the transmitting array antenna 5 of the planar antenna. The transmit signal is radiated from the transmit array antenna 5, reflected by an obstacle such as a preceding vehicle, and then received by the receiving array antennas 1 to 3. In the transmitter-receiver unit 15, receive signals S1 to S3 are added to mixers 11a to 11c, mixed with an output signal of the oscillator 10, and converted into intermediate frequency signals, respectively. Also, the intermediate frequency signals are amplified by low noise amplifiers 12a to 12c, and then input to a signal processing circuit (DTM) 14 through A/D converters 13a to 13c, respectively.

The signal processing circuit 14 generates an antenna radiation pattern in which the respective directivities are synthesized after the weighting of the amplitude/phase of the respective receiving array antennas has been controlled, scans two nulls, independently, and detects the azimuth orientation of the obstacle. The signal processing circuit 14 is composed of a CPU, a memory, and a data processor that holds program, and has functions of fast Fourier transform (FFT) processing, peak search processing, target position calculation, object tracking processing, and so on. The respective functions of the signal processing circuit are obtained by executing arithmetic processing based on various computer programs by the CPU. That is, the signal processing circuit 14 allows a radio wave transmitted from the transmitting array antenna to be reflected by at least one obstacle and received by the three receiving array antennas as a receive signal, the respective receive signals to be weighted in amplitude/phase, and synthesized in directivity, and an azimuth angle being null or low sensitivity to be scanned to specify the azimuth orientation of at least one obstacle. In the signal processing circuit 14 according to this embodiment, a process for detecting the azimuth orientation of the obstacle is made by using the antenna radiation pattern in which the directivities are synthesized due to the super-resolution method or the like.

The transmitting array antenna 5, the receiving array antennas 1, 2, and 3, are composed of antenna elements 5a to 5d, 1a to 1d, 2a, and 3a to 3d, respectively, and aligned in a horizontal direction.

As shown in (B) of FIG. 1, the number of antenna elements (1a to 1d, 3a to 3d) of the receiving array antennas 1 and 3 at both outer ends thereof which are arranged in the horizontal direction is larger than the number of antenna elements (2a) of the receiving array antenna 2 in the center thereof. Also, the outermost antenna elements (1d, 3d) is smaller than the innermost antenna elements (1a, 3a) in the weighting (A1 to A4) of the receiving sensitivity of the receiving array antennas 1 and 3 at both outer ends thereof in the horizontal direction.

That is, the weighting of receiving sensitivities of the antenna elements 1a, 1b, 1c, and 1d of the receiving array antenna 1 are A1, A2, A3, and A4, which are monotonically decreased from an inner side toward an outer side as represented by A1≧A2≧A3≧A4. Distances from the receiving array antenna 2 are d1, d2, d3, and d4, respectively. On the other hand, the weighting of the receiving sensitivity and the distance of the receiving array antenna 3 have a symmetric relationship with the receiving array antenna 1 with respect to the receiving array antenna 2 as an axis (element coordinates=0). In this embodiment, the receiving sensitivity of the element 2a of the receiving array antenna 2 is equal to the receiving sensitivity A1 of the antenna element 1a of the receiving array antenna 1 and the antenna element 3a (the distance is d1) of the receiving array antenna 3. However, the receiving sensitivity of the element 2a of the receiving array antenna 2 does not need to be equal to the receiving sensitivity of the antenna element 1a of the receiving array antenna 1 and the antenna element 3a of the receiving array antenna 3, and can be made larger or smaller according to the intended purpose. However, it is necessary that the receiving sensitivity of the element 2a of the receiving array antenna 2 is larger than at least the receiving sensitivity of the outermost antenna element (1d, 3d) (the same is applied to the following embodiments).

Figure 2A:
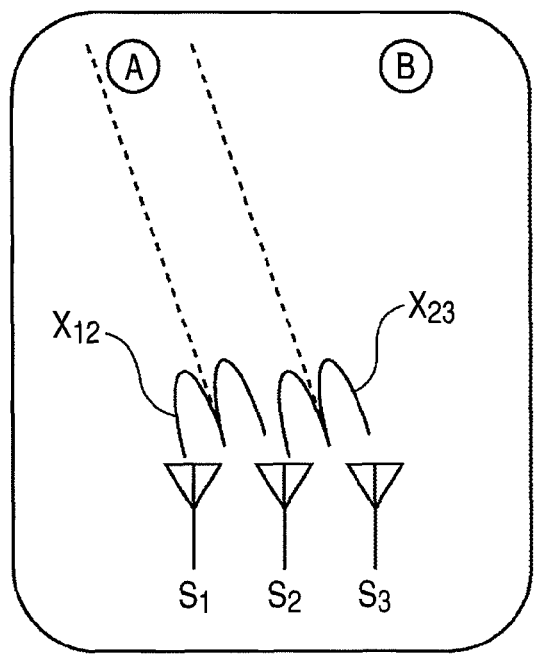
FIG. 2A is a diagram for explaining an example of signal processing for detecting an azimuth orientation of an obstacle according to receive signals S1 to S3 in this embodiment.
Figure 2B:
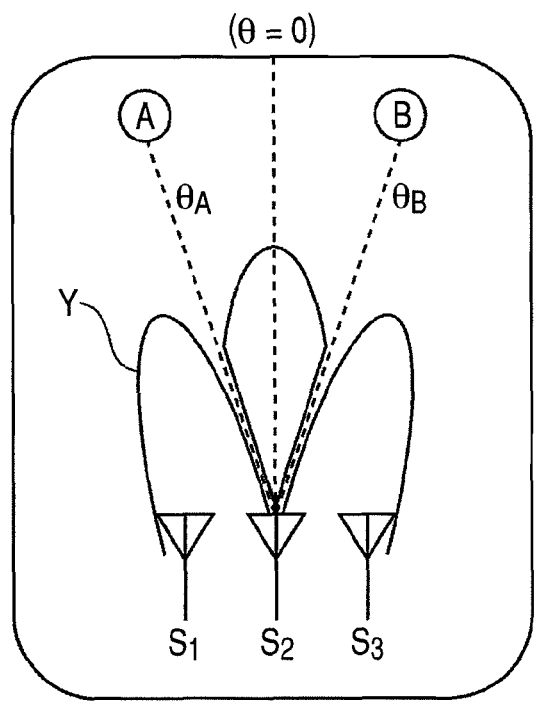
FIG. 2B is a diagram for explaining another example of signal processing for detecting an azimuth orientation of an obstacle according to receive signals S1 to S3 in this embodiment.

An example of signal processing for detecting the azimuth orientation of an obstacle by the transmitter-receiver unit 15 according to the receive signals S1 to S3 will be described in brief with reference to FIG. 2 (FIGS. 2A and 2B).

In the signal processing circuit, a null point that can be produced by synthesis of the receive signals S1 to S3 from the three receiving antennas is scanned by the phase operation of the respective signals, and a point at which the synthetic receive electric power becomes minimum is searched, thereby determining a target position. First, azimuth characteristic patterns (beam patterns) $X_{12}$ and $X_{23}$ by two receiving antennas so that null is toward a direction of a target A indicated by a broken line in FIG. 2A are produced. The azimuth characteristic patterns $X_{12}$ and $X_{23}$ are represented by the following expressions (2) and (3), respectively.

$$X_{12}=S_1 \times \exp(i\phi_A)-S_2 \quad (2)$$

$$X_{23}=S_2 \times \exp(i\phi_A)-S_3 \quad (2)$$

In this case, $X_{12}$ and $X_{23}$ represent a state in which only the reflected wave is received from the target B.

Subsequently, a process for producing the null point by the above two beam patterns by the aid of the following Expression (4), in other words, a process for obtaining θ0 at which Y is minimum when θ is scanned is executed.

$$Y=X_{12} \times \exp(i\phi_B)-S_{23} \quad (4)$$

Through the above processing, two null points can be produced in directions indicated by broken lines in FIG. 2B. When the null points are toward the respective targets (θA, θB), the reflected waves are not received from the targets A and B.

In real processing, processing for correcting the antenna gain is added. Details of the signal processing through the super-resolution method are aided by the description of the "Kikuma" or JP-A-2003-270316.

According to the present invention, as will be described above, even if the number of antenna elements is increased, the equivalent inter-receiving-antenna distances of the receiving array antennas 1, 2 and 2, 3 can be maintained to be short, and the return of the phase difference of the receive signal can be reduced. Also, since the phase characteristics of the innermost antenna element 1a and the other antenna elements 1b to 1d are inverted, the return of the phase difference between the receiving array antennas 1 and 2 can be further suppressed. The same is applied to the phase difference between the receiving array antennas 2 and 3.

Similarly, in the antenna elements 5a to 4d of the transmitting array antenna 5, the weighting of the outer elements 5a and 5d is reduced as compared with that of the center side elements 5b and 5c, thereby enabling the antenna radiation pattern that reduces a side lobe in the horizontal direction to be obtained.

It is needless to say that a parameter is variable within a range where the antenna radiation pattern can obtain a sufficient SN ratio in a desired azimuth angle detection range, and the number of antenna elements can be changed without any problem.

Hereinafter, the reason why the return of the phase difference of the receive signal can be reduced according to the present invention will be described.

First, when a phase difference $\Delta\phi_{21}$ $(=\phi_2-\phi_1)$ of the receiving array antennas 1 and 2 is calculated by using a parameter shown in FIG. 1, the following expressions (5) and (6) are obtained.

$$\Delta\phi_{21} = \tan^{-1}\left(\frac{A_1\sin\psi_1 + A_2\sin\psi_2 + A_3\sin\psi_3 + A_4\sin\psi_4}{A_1\cos\psi_1 + A_2\cos\psi_2 + A_3\cos\psi_3 + A_4\cos\psi_4}\right) \quad (5)$$

$$\psi_n = \frac{2\pi}{\lambda}d_n\sin\theta \quad (6)$$

The mutual coupling between the antenna elements is ignored, and it is assumed that the respective antenna elements are in phase.

Figure 3:
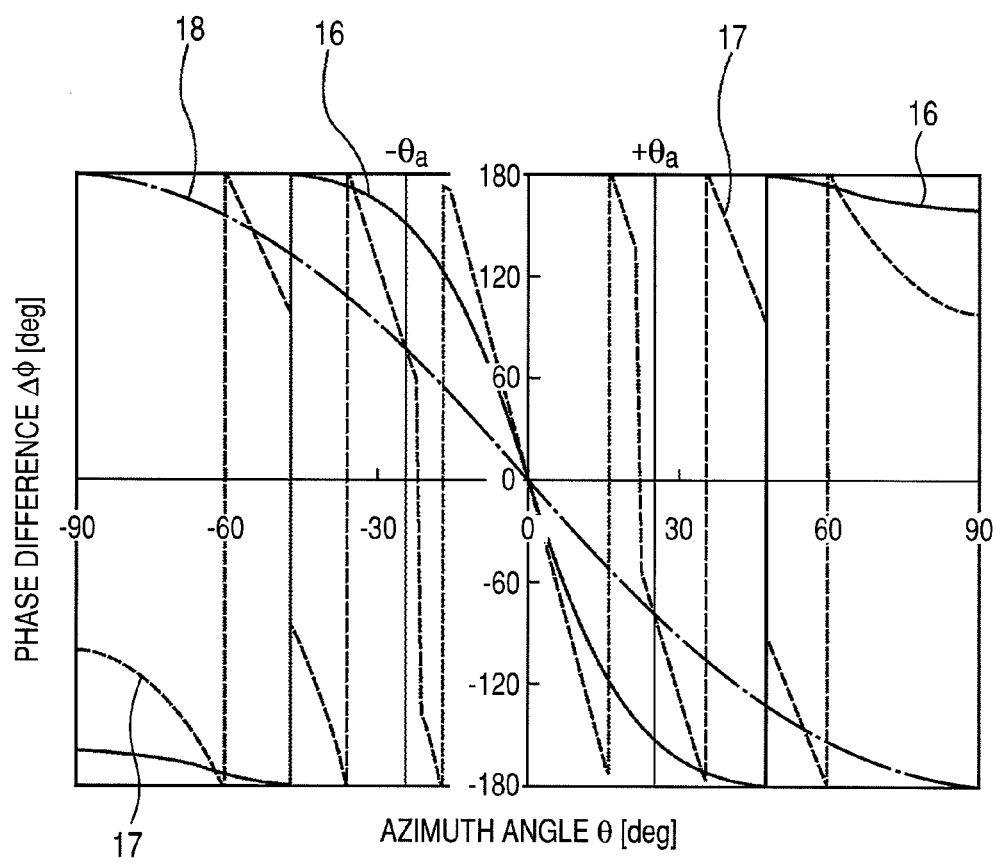
FIG. 3 is a graph showing an effect to a phase difference characteristic according to a first embodiment.

FIG. 3 is the calculation results of the phase difference characteristic using the above expression.

A phase difference curve 16 shows a case in which the weighting of the receiving sensitivity is monotonically decreased ($A_1$=1.0, $A_2$=0.9, $A_3$=0.4, $A_4$=0.1, $d_1$=0.69/λ, $d_2$=1.38/λ, $d_3$=2.07/λ, and $d_4$=2.76/λ).

A phase difference curve 17 shows a case in which all of four elements are of the same sensitivity ($A_1$=$A_2$=$A_3$=$A_4$=1.0, $d_1$=0.69/λ, $d_2$=1.38/λ, $d_3$=2.07/λ, $d_4$=2.76/λ). A phase difference curve 18 shows a case of only one element ($A_1$=1.0, $A_2$=$A_3$=$A_4$=0, $d_1$=0.5/λ).

The phase difference curve 17 generates plural times (six times) of returns in a range of from −90 degrees to +90 degrees, plural azimuth orientation values θ correspond to one phase difference value $\Delta\phi_{21}$, and a necessary azimuth detection range cannot be obtained. Also, the phase difference curve 18 has no return in the range of from −90 degrees to +90 degrees, which appears to be ideal. However, because a slope of the curve is small, a high azimuth resolution performance cannot be obtained.

On the contrary, the phase difference curve 16 has no return in a range of from −45 degrees to +45 degrees, and enables the azimuth detection in at least a range of from −25 degrees to +25 degrees. Further, because a slope of the curve is large, the high azimuth resolution performance can be obtained.

Also, since a phase difference $\Delta\phi_{23}$ (=$\phi_2-\phi_3$) of the receiving array antennas 2 and 3 also has a relationship of $\Delta\phi_{23}=-\Delta\phi_{21}$), the same discussion can be permitted.

Now, a principle of the return reduction will be described. In order to eliminate the return in a range of $\theta a<\theta<90$ [degrees] in FIG. 3, $\Delta\phi_{21}\approx-180$ [degrees] must be met, and this value is assigned to Expression (5), and developed to obtain the following Expression (7).

$$f_T(\theta)=A_1 \cos \psi_1 + A_2 \cos \psi_2 + A_3 \cos \psi_3 + A_4 \cos \psi_4 \to 0 \quad (7)$$

That is, when $A_1$ to $A_4$ and $d_1$ to $d_4$ are so selected as to satisfy $f_T(\theta)\to 0$ in a range of $\theta a<\theta<90$ (degrees), the return can be reduced.

Figure 4:
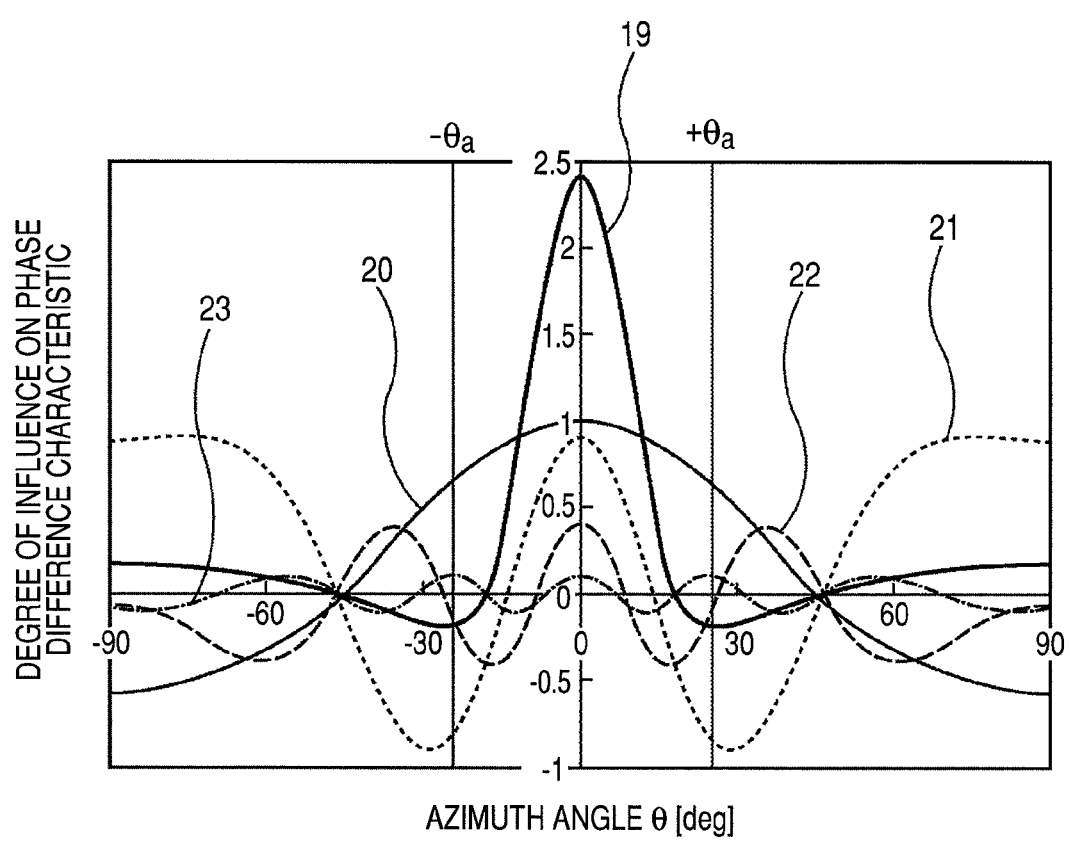
FIG. 4 is a graph showing a return reduction of the phase difference characteristic according to the first embodiment.

FIG. 4 shows an influence of the respective antenna elements on $f_T(\theta)$ in the case of the phase difference characteristic 16 in FIG. 3, and characteristic curves 20 to 23 are first to fourth terms of Expression (7), respectively, that is, correspond to the antenna elements 1a to 1d. A sum of the characteristic curves 20 and 22, and a sum of the characteristic curves 21 and 23 are inverted in a range of $\theta a<\theta<90$ (degrees) with the result that it is found that the characteristic curve 19 representative of $f_T(\theta)$ becomes a value close to zero in the range of $\theta a<\theta<90$ [degrees]. In this way, the return is reduced in the range of $\theta a<\theta<90$ [degrees]. The same is applied to a case in which the azimuth angle $\theta$ is in a negative range.

Figure 5:
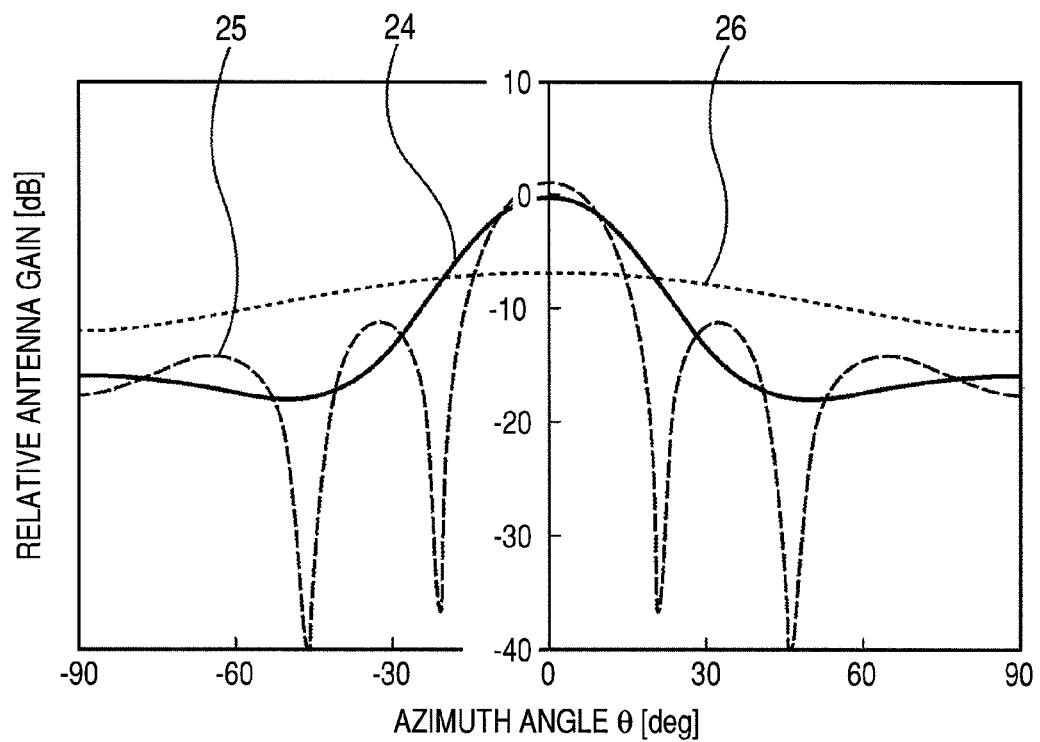
FIG. 5 is a graph showing an effect to an antenna radiation pattern according to the first embodiment.

The calculation results of the antenna radiation pattern in the above three examples are shown in FIG. 5. The antenna gain of $\theta=0$ in the case where the weighting of the receiving sensitivity is monotonically decreased is standardized as 0 dB. The following Expression (8) is used for the calculation.

$$f(\theta)=e(\theta)[A_1\exp(j\psi_1)+A_2\exp(j\psi_2)+A_3\exp(j\psi_3)+A_4\exp(j\psi_4)] \quad (8)$$

In this expression, $e(\theta)$ is an element directivity, and a standard micro-strip patch antenna is used for the calculation. The mutual coupling between the antenna elements is ignored, and it is assumed that the respective antenna elements are in phase.

The gain curve 25 when all of four elements are of the same sensitivity is the maximum in the antenna gain in the front direction, but the side lobe is high. Also, a gain curve 26 in the case of only one element is low in the antenna gain, and wide in the beam width. On the contrary, the gain curve obtained by the present invention, that is, a gain curve 24 when the weighting of the receiving sensitivity is monotonically decreased is slightly lower in the antenna gain than the gain curve 25, but is effective since the return of the phase can be reduced as described above.

Figure 6A:
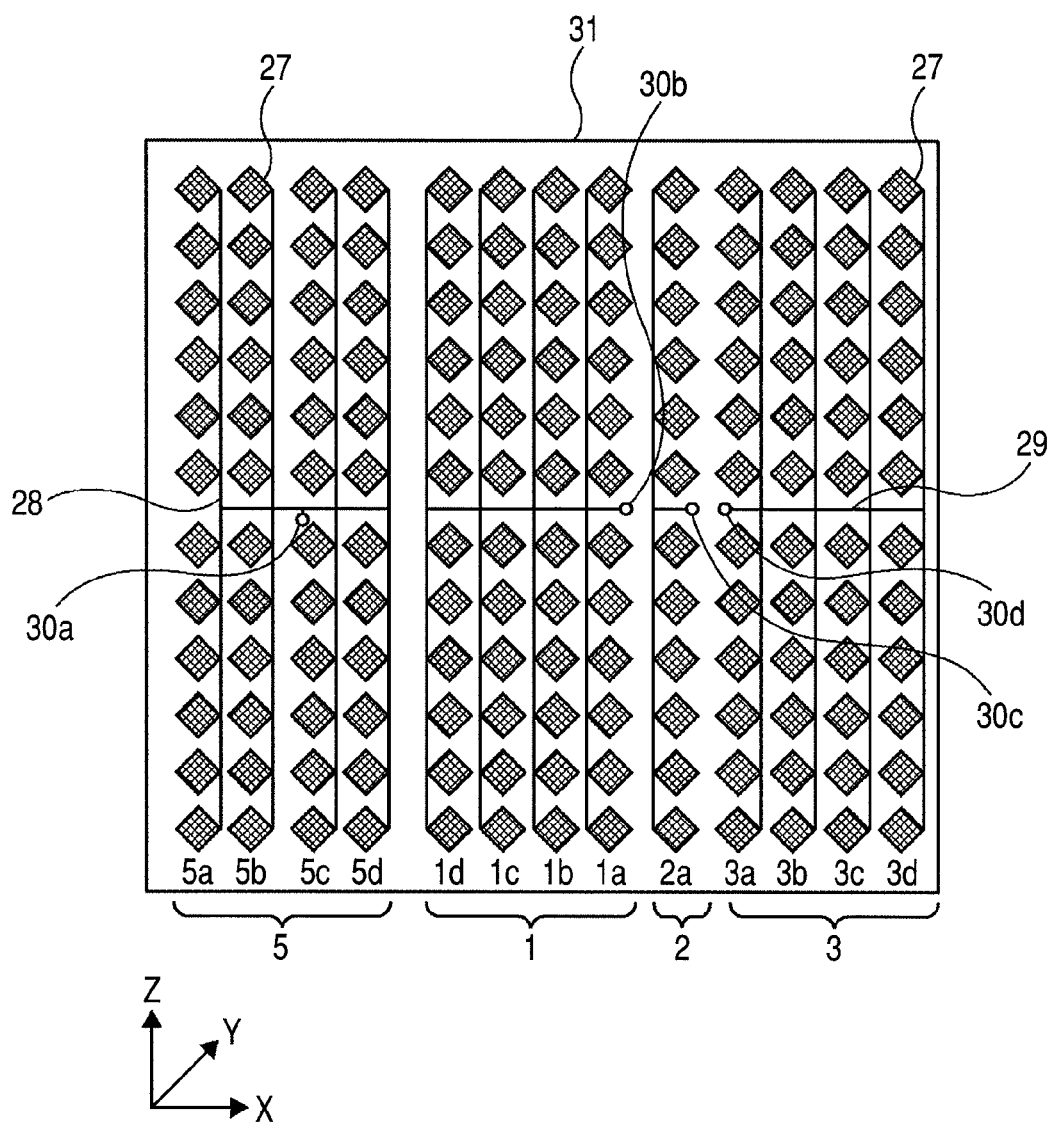
FIG. 6A is an upper view of an antenna used in the first embodiment of the present invention.
Figure 6B:
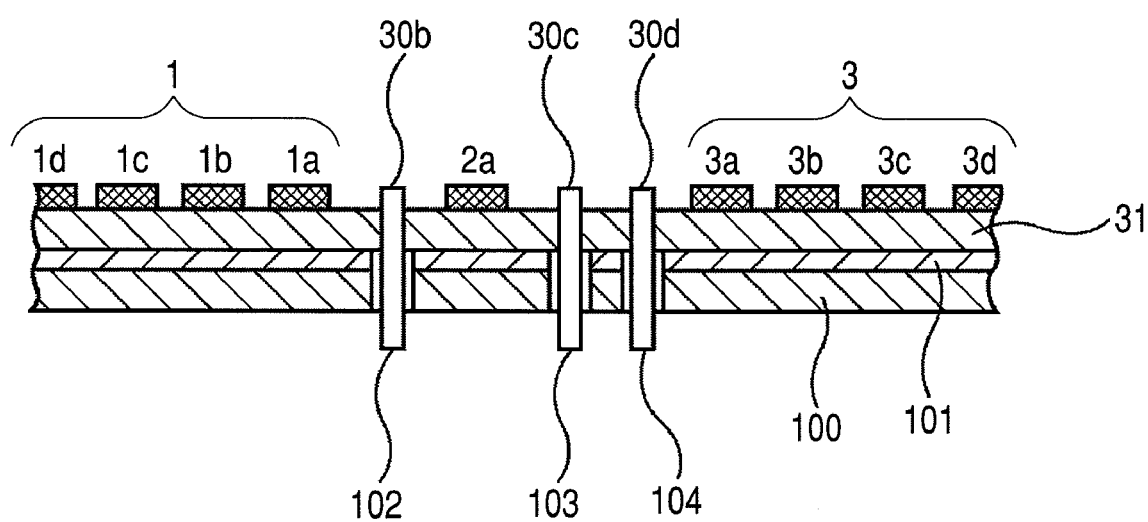
FIG. 6B is a partially enlarged longitudinal cross-sectional view of a receiving array antenna in FIG. 6A.

Subsequently, a description will be given of a more specific configuration example of the planar antenna in the first embodiment will be described with reference to FIG. 6 (6A, 6B). FIG. 6A is a plan view of the micro-strip patch antenna (1 to 5) used in the first embodiment. FIG. 6B is a diagram showing a partially enlarged longitudinal cross-sectional view of the receiving array antenna in FIG. 6A. An x-axis of FIG. 6A represents a horizontal direction whereas a z-axis represents a vertical direction.

In the planar antenna, the respective antenna elements of the transmitting array antenna 5 and the receiving array antennas 1, 2, 3 are arrayed on a common dielectric substrate 31 in the vertical direction. That is, the transmitting array antenna 5, and the receiving array antennas 1, 2, 3 are composed of the antenna element trains 5a to 5d, 1a to 1d, 2a, and 3a to 3d, which are aligned in the vertical direction, respectively. Up to FIG. 5, the receiving array antennas have been described not as the antenna element train but as the antenna elements. However, because the respective antenna elements are generally arrayed in the vertical direction for narrowing the beam and lowering the side lobe in the elevation angle demanded for the automotive radar intended purpose, the receiving array antenna will be described as the antenna element train in FIG. 6 and the subsequent figures.

The respective antenna element trains 1 to 5 are subjected to series feed in the same phase by means of micro-strip lines 28 and 29 connected to plural patch elements 27. Feeding points 30a to 30d are interfaces with the circuit element side of the transmitter-receiver unit 15. Since the dielectric substrate 31 is a thin substrate of several hundreds microns, the dielectric substrate 31 is held by an antenna plate 100 which has rigidity.

An earth conductor 101 is laminated on a rear surface of the dielectric substrate 29. On the antenna plate 100 are disposed coaxial lines 102, 103, and 104 for feeding electricity in series to the respective antenna elements from the transmitter-receiver unit disposed on the rear surface of the antenna plate 100 through the feeding points 30a to 30d and the micro-strip lines 28, 29.

Since the weighting of the receiving sensitivity of the planar antenna is determined according to the ratio of the input impedances of the antenna element trains 1a to 1d in relation to the micro-strip line 29 extending in the horizontal direction, the weighting can be readily realized by merely appropriately changing the width of the micro-strip line 29.

Since the above-mentioned weighting of the receiving sensitivity is determined according to the ratio of the input impedances of the antenna element trains 3a to 3d in relation to the micro-strip line 29 extending in the horizontal direction, the weighting can be readily performed by merely appropriately changing the width of the micro-strip line 29. It is needless to say that the weighting may be realized by changing the size of the antenna element per se.

Figure 7A:
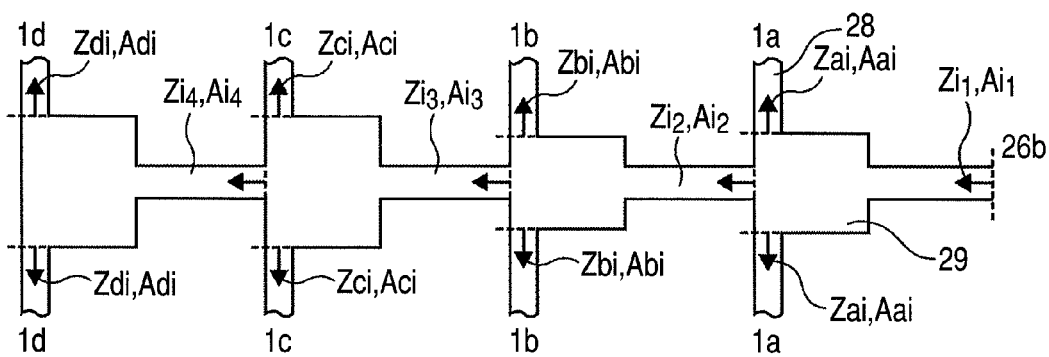
FIG. 7A is a diagram conceptually showing an example of a pattern in which a width of micro strip lines is changed in order to weight a receiving sensitivity.

FIG. 7A is a diagram conceptually showing an example of a pattern in which the width of the micro-strip line 29 is changed for weighting the receiving sensitivity.

Referring to FIG. 7A, reference symbols Zi1 and A1 denote an input impedance and a feeding electric power in which the antenna element trains 1a to 1c and the strip line 29 are synthesized. Reference symbols Zai and Aai are an input impedance and feeding electric power of the antenna element train 1a, and Zi2 and Ai2 are an input impedance and feeding electric power in which the antenna element trains 1b to 1c and the strip line 29 are synthesized. Reference symbols Zbi and Abi are an input impedance and the sensitivity of the antenna element train 1b. Reference symbols Zi3 and Ai3 are an input impedance and the sensitivity in which the antenna element train 1c and the strip line 29 are synthesized. Reference symbols Zci and Aci are an input impedance and the sensitivity of the antenna element train 1c. Further, reference symbols Zi4 and Ai4 are an input impedance and the sensitivity in which the antenna element train 1d and the strip line 29 are synthesized, and Zdi and Adi are an input impedance and the sensitivity of the antenna element train 1c. The respective line widths are changed to match the respective impedances with each other, thereby obtaining a given weighting.

Figure 7B:
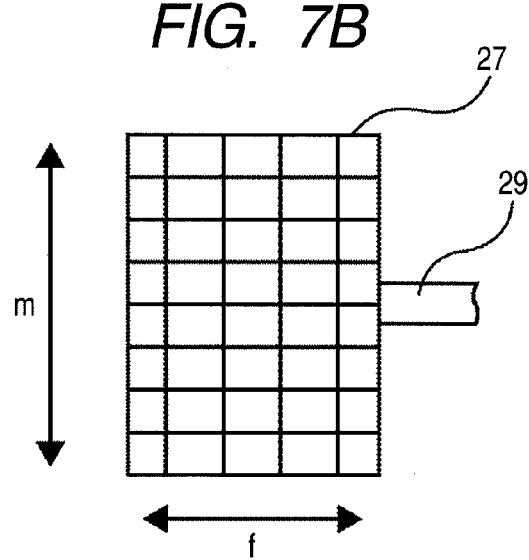
FIG. 7B is a diagram showing an example that the weighting of the receiving sensitivity of a planar antenna is changed by changing a shape of the antenna element.

The weighting of the receiving sensitivity of the planar antenna may be realized by changing the planar size of the antenna element (patch element 27) per se. In a rectangular antenna element 27 shown in FIG. 7B, a frequency f is changed when the width in the horizontal direction is changed, and an impedance m is changed when the height in the vertical direction is changed.

When the element of the antenna, for example, the weighting of the receiving sensitivity is monotonically decreased, the size of the planar pattern of the respective antenna elements may be sequentially decreased in correspondence with the decreased weighting. Also, it is needless to say that an element of another pattern such as a circle may be used as the antenna element.

As described above, since this antenna can be processed by the technique of the printed circuit board, and the circuit element and the signal processing unit are of the general configuration, there can be obtained the automotive radar that enables precise azimuth angle detection having a narrow angle beam without increasing the number of parts and a data update cycle with the light weight and low costs.

Also, in this embodiment, the receiving array antennas 1 and 3 are described with four elements, but the same effect is obtained when three or more elements are provided. The effect of a reduction in the number of returns is larger as the number of elements is larger. The phase difference $\Delta\phi_{21}$ ($=-\Delta\phi_{23}$) and the antenna radiation pattern $f(\theta)$ when the receiving array antenna has n elements are represented by the following Expressions (9) and (10).

$$\Delta\phi_{21} = \tan^{-1}\left[\frac{\sum_{i=1}^{n} A_i \sin\{(2\pi/\lambda)d_i \sin\theta\}}{\sum_{i=1}^{n} A_i \cos\{(2\pi/\lambda)d_i \sin\theta\}}\right] \quad (9)$$

$$f(\theta) = e(\theta) \times \sum_{i=1}^{n} A_i \exp\{j(2\pi/\lambda)d_i \sin\theta\} \quad (10)$$

The number of elements of the receiving array antenna 2 may also be increased, but because the distance between the receiving array antennas is naturally widened, constraint conditions that the number of elements is only as big as the phase is not returned are required.

The use of the configuration of the present invention enables the angle detection of the normal phase comparison monopulse system, which can be applied to a case in which one obstacle should be detected.

Second Embodiment

In the first embodiment of the present invention, plural receiving array antennas are divided into two (right and left) groups with one receiving array antenna as a center. Alternatively, a boundary line may be defined between two receiving array antennas to divide plural receiving array antennas into two (right and left) groups.

Figure 8:
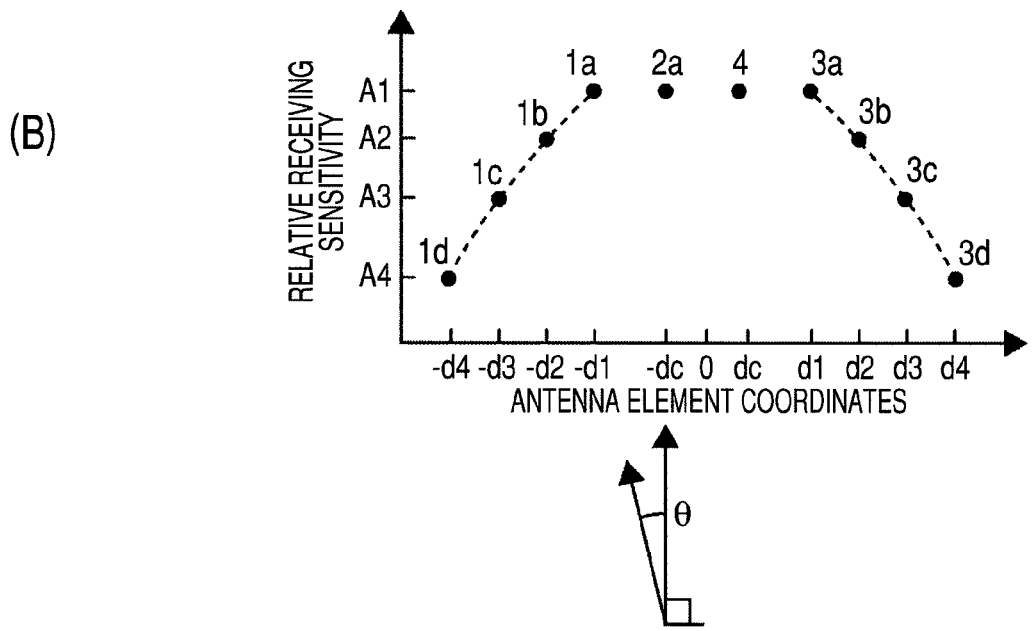
FIG. 8 is a configuration diagram showing a mobile radar according to a second embodiment of the present invention.
Figure 8:
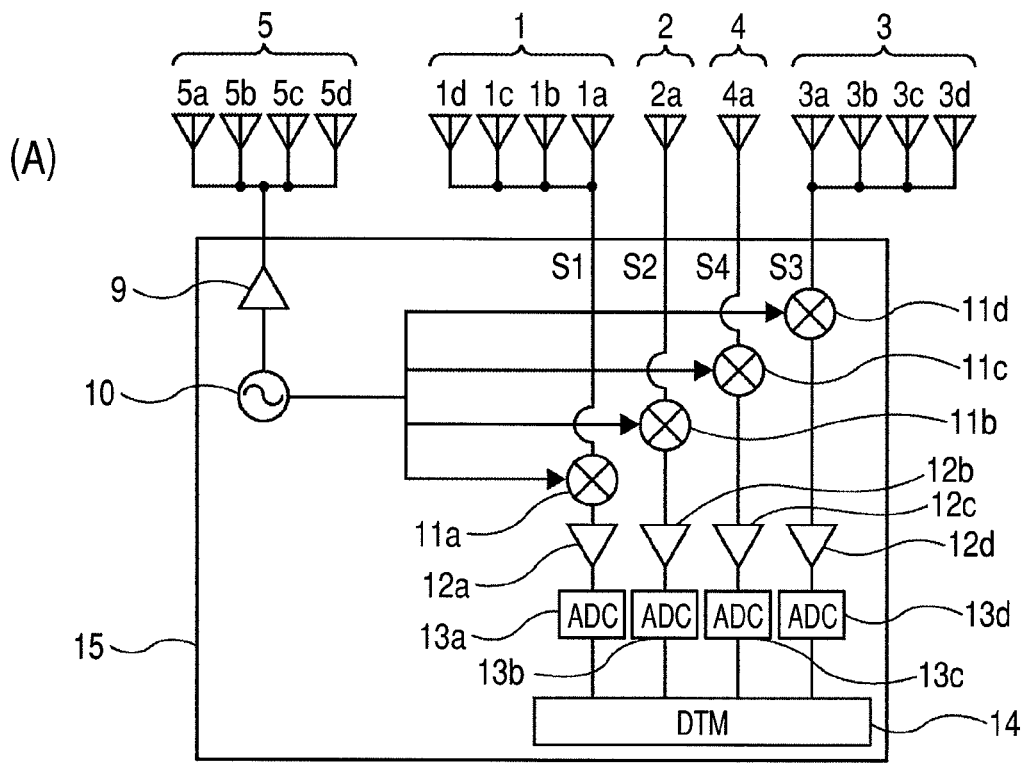

FIG. 8 is a configuration diagram showing a mobile radar according to a second embodiment of the present invention. (A) of FIG. 8 is a conceptual diagram showing the configuration of the mobile radar according to the second embodiment, and (B) is a diagram showing a relationship the antenna element coordinates and the relative receiving sensitivity of the mobile radar shown in (A) of FIG. 8. A millimeter wave signal generated by the oscillator 10 is added to the transmitting array antenna 5 through the power amplifier 9. The transmit signal radiated from the transmitting array antenna 5 is reflected by the obstacle, and received by the receiving array antennas 1 to 4. The receiving signals S1 to S4 are added to the mixers 11a to 11d, respectively, and mixed with the output signal of the oscillator 10 so as to be converted into an intermediate frequency signal. Then, the intermediate frequency signal is amplified by low noise amplifiers 12a to 12d, and input to the signal processing circuit 14 through the A/D converters 13a to 13d. In the signal processing circuit 14, the antenna radiation pattern in which the directivities are synthesized after the weighting of the amplitude/phase of the respective receiving array antennas has been controlled is generated, and three nulls are scanned, independently, to detect the azimuth orientation of the obstacle.

The transmitting array antenna 5, and the receiving array antennas 1, 2, 4, 3 are composed of the antenna elements 5a to 5d, 1a to 1d, 2a, 4a, 3a to 3d, respectively, and are aligned in the horizontal direction. Similarly, in this embodiment, the number (four in this embodiment) of antenna elements of the receiving array antennas 1 and 3 at both outer ends thereof which are aligned in the horizontal direction is larger than the number (each one in this embodiment) of antenna elements of the receiving array antennas 2 and 4 at the center side which are aligned in the horizontal direction. Also, the weighting of receiving sensitivities of the antenna elements 1a, 1b, 1c, and 1d of the receiving array antenna 1 are A1, A2, A3, and A4, which are monotonically decreased from an inner side toward an outer side as represented by A1≧A2≧A3≧A4. Distances from the center point of the receiving array antenna 2 and 4 are d1, d2, d3, and d4, respectively. Also, a distance between an intermediate point (0) of the receiving array antennas 2 and 4 and the receiving array antenna 2 is dc.

On the other hand, the weighting of the receiving sensitivities and the distances of the receiving array antennas 3 and 4 have a symmetric relationship with the receiving array antennas 2 and 1 with respect to an intermediate point of the receiving array antennas 2 and 4 as an axis.

In other words, four receiving array antennas are aligned in the horizontal direction, and the number of antenna elements of the receiving array antennas 1 and 3 at both outer ends thereof which are aligned in the horizontal direction is larger than the number of antenna elements of the receiving array antennas 2 and 4 at the center side which are aligned in the horizontal direction. Also, when a boundary may be defined between two receiving array antennas 2 and 4 at the center side to divide the receiving array antennas into two groups (1 and 2, 3 and 4), the outermost antenna elements (1d, 3d) are smaller than the innermost antenna elements (1a, 3a) in the weighting of the receiving sensitivity of the receiving array antennas at both sides thereof in the horizontal direction. Also, the weighting of the receiving sensitivity of the antenna elements (1a, 2a, 3a, 4a) at the center side is equal to each other.

With the above configuration, the equivalent inter-receiving-antenna distance can be maintained to be small, and the phase between the antenna elements is cancelled, thereby enabling the return of the phase difference characteristic between the receiving array antennas 1 and 2 and between the receiving array antennas 3 and 4 to be reduced.

This embodiment has four receiving array antennas, and can detect three constant-velocity obstacles at maximum, separately. In this embodiment, the receiving array antennas 1 to 4 have been described as four elements, but the same effect is obtained when four or more elements are provided, and the effect of a reduction in the number of returns is larger as the number of elements is larger.

When two constant-velocity obstacles are intended to be separated and detected, it is possible that three receiving array antennas are selected from four receiving array antennas to execute the same processing as that in the first embodiment. It is needless to say that the angle detection of the normal phase comparison monopulse system can be applied when one obstacle is to be detected.

Third Embodiment

The present invention can be applied to a case where four or more constant-velocity obstacles is to be separated and detected, that is, a case where five or more receiving array antennas are necessary.

Figure 9:
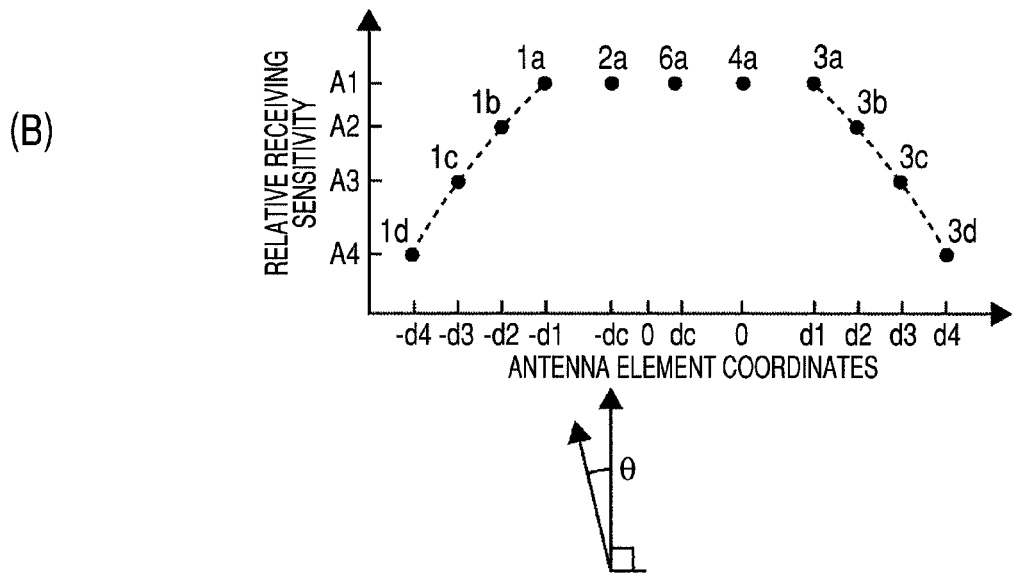
FIG. 9 is a configuration diagram showing a mobile radar according to a third embodiment of the present invention.
Figure 9:
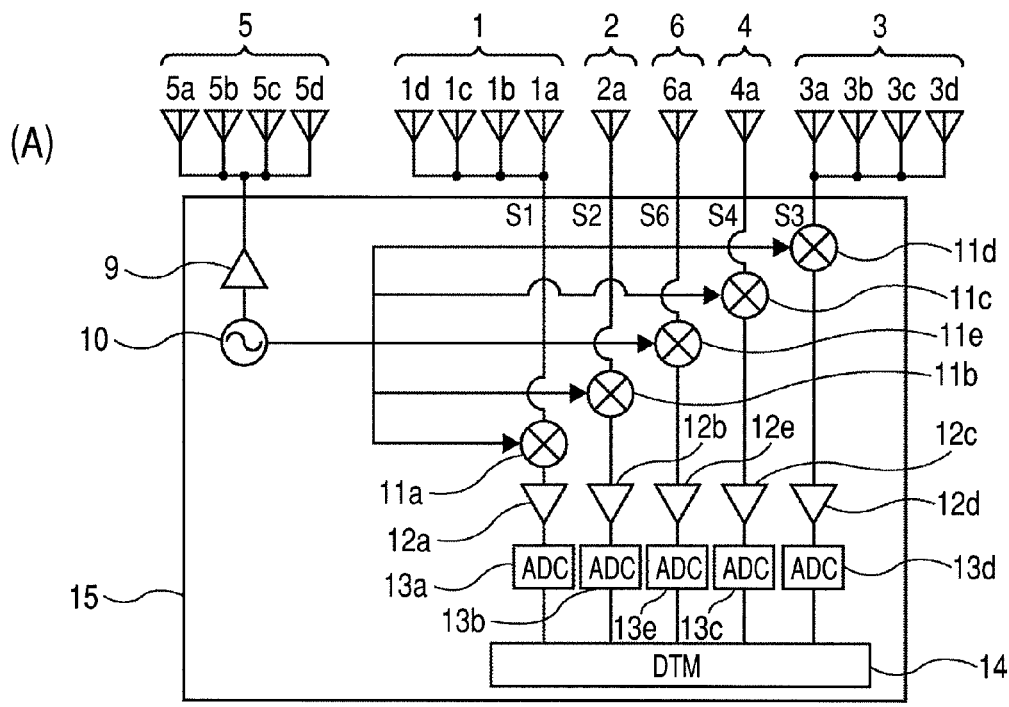

FIG. 9 is a configuration diagram showing a mobile radar according to a third embodiment of the present invention. (A) of FIG. 9 is a conceptual diagram showing the configuration of the mobile radar according to the third embodiment, and (B) of FIG. 9 is a diagram showing a relationship between the antenna element coordinates and the relative receiving sensitivity of the mobile radar shown in (A). The transmitting array antenna 5, and the receiving array antennas 1, 2, 6, 4, and 3 are composed of the antenna elements 5a to 5d, 1a to 1d, 2a, 6a, 4a, and 3a to 3d, respectively, and aligned in the horizontal direction. Similarly, in this embodiment, the number (four in this embodiment) of antenna elements of the receiving array antennas 1 and 3 at both outer ends thereof which are aligned in the horizontal direction is larger than the number (each one in this embodiment) of antenna elements of the receiving array antennas 2, 6 and 4 at the center side which are aligned in the horizontal direction. Also, the weighting of receiving sensitivities of the antenna elements 1a, 1b, 1c, and 1d of the receiving array antenna 1 are A1, A2, A3, and A4, which are monotonically decreased from an inner side toward an outer side as represented by A1≧A2≧A3≧A4. A distance from the center point (0) of the receiving array antenna 2 and 6 to the receiving array antenna 2 is dc.

On the other hand, the weighting of the receiving sensitivity and the distance of the receiving array antenna 3 have a symmetric relationship with the receiving array antennas 2 and 1 with respect to an intermediate point (0) of the receiving array antennas 2 and 6 as an axis.

The transmit signal radiated from the transmitting array antenna 5 is reflected by the obstacle, and received by the receiving array antennas 1 to 4. The receiving signals S1 to S4 and S6 are added to the mixers 11a to 11d, respectively, and mixed with the output signal of the oscillator 10 so as to be converted into an intermediate frequency signal. Then, the intermediate frequency signal is amplified by low noise amplifiers 12a to 12e, and input to the signal processing circuit 14 through the A/D converters 13a to 13e. In the signal processing circuit 14, the antenna radiation pattern in which the directivities are synthesized after the weighting of the amplitude/phase of the respective receiving array antennas has been controlled is generated, and nulls are scanned to detect the azimuth orientation of the obstacle.

With the above configuration, the equivalent inter-receiving-antenna distance can be maintained to be small, and the phase between the antenna elements is cancelled, thereby enabling the return of the phase difference characteristic between the receiving array antennas 1 and 2 and between the receiving array antennas 3 and 4 to be reduced.

Figure 10:
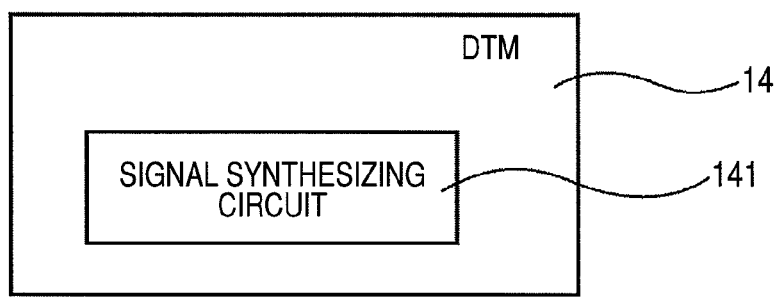
FIG. 10 is a diagram for explaining the operation of a signal processing circuit according to a third embodiment of the present invention.
Figure 10:
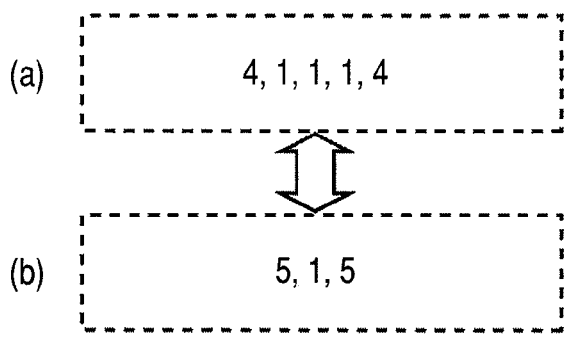

In this embodiment, as shown in FIG. 10, the signal processing circuit (DTM) 14 has a directivity synthesizing circuit 141, and executes a directivity synthesizing process on the respective signals of one receiving array antenna elements 1a to 1d, 2a, 6a, 4a, and 3a to 3d.

For example, as shown in a dashed line part (a), the selection of the signals from the receiving array antenna element is set to 5 groups of "4, 1, 1, 1, 4", thereby enabling four constant-velocity obstacles to be separated and detected from five receiving array antenna signals in total. On the other hand, as shown in a dashed line part (b), the selection of the signals from the receiving array antenna element is set to three groups of "5 (elements 1a to 1d, 2a), 1 (6a), 5 (4a, 3a to 3d)" by synthesizing the directivity, thereby enabling two constant-velocity obstacles to be separated and detected. It is needless to say that the angle detection of the normal phase comparison monopulse system can be applied to a case in which one obstacle is to be detected.

Fourth Embodiment

Figure 11A:
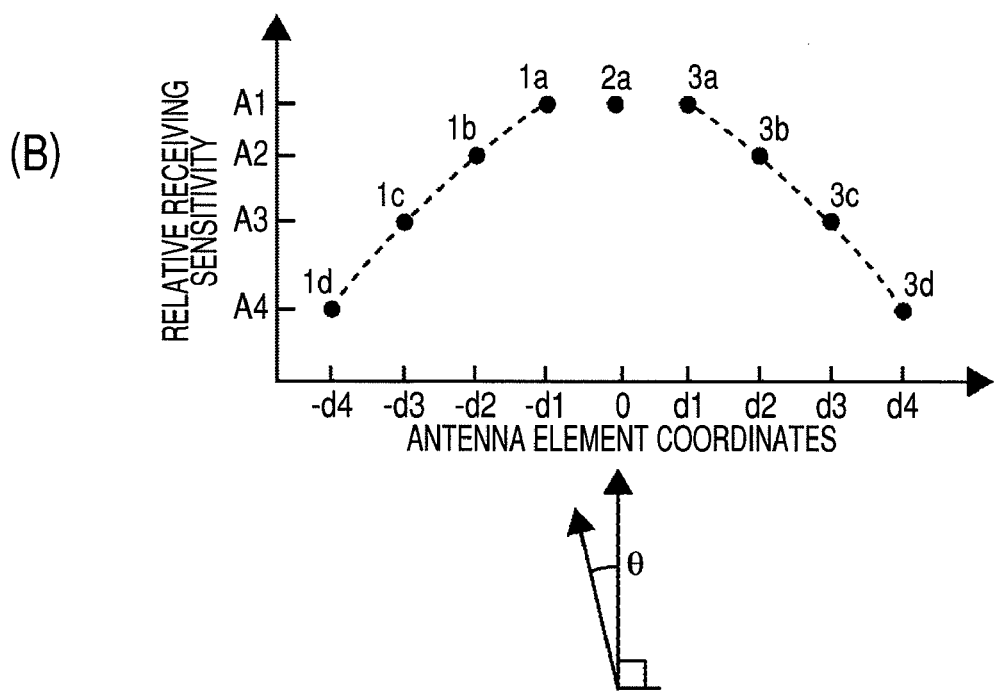
FIG. 11A is a plan view showing an antenna according to a fourth embodiment of the present invention.
Figure 11A:
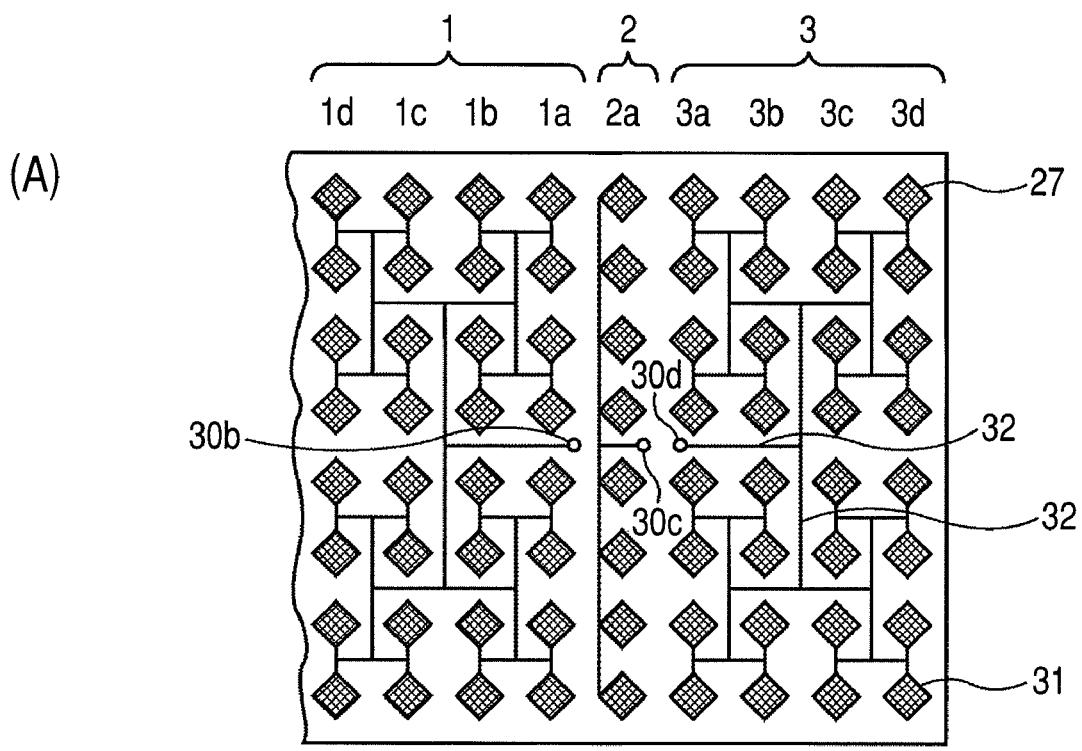
Figure 11B:
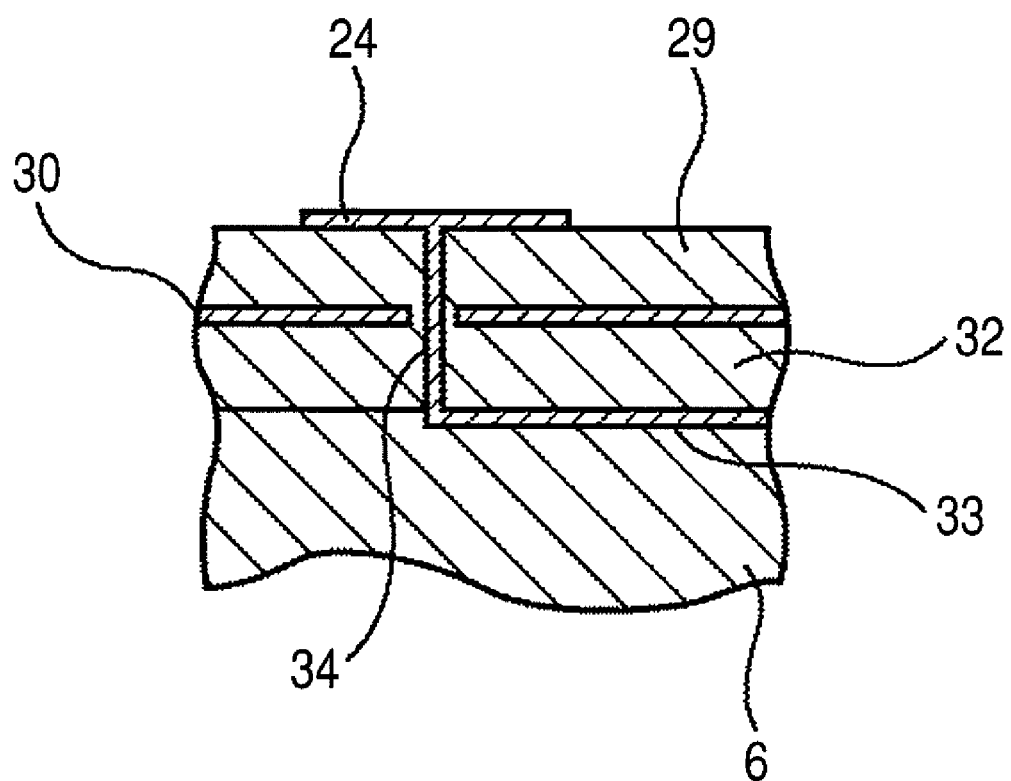
FIG. 11B is a partially enlarged longitudinal cross-sectional view of a receiving array antenna in FIG. 11A.

An example of series feeding has been described as the first embodiment of the present invention. Similarly, in the parallel feeding, the width of the micro-strip line is changed so as to weight the receiving sensitivity. FIG. 11 (11A, 11B) shows a conceptual diagram showing an embodiment applied to the parallel feeding as the fourth embodiment of the present invention. FIG. 11A is a plan view of an antenna in the fourth embodiment, and FIG. 11B is a diagram showing a partially enlarged longitudinal cross-sectional view of the receiving array antenna shown in FIG. 11A.

As in the above first embodiment, the planar antenna of the antenna unit has an upper layer dielectric substrate on which the antenna elements having plural patches are arranged in a matrix, a lower layer dielectric substrate, and parallel feeding lines 32 set so that line lengths extending from the feeding terminals 30b and 30c to all of the antenna elements 27 are substantially equal to each other, are laminated on each other. Feeding points are set at the same position in the respective antenna elements 27, and those feeding points and the parallel feeding lines 32 are connected to each other by via holes that pass through both the dielectric substrates. A micro-strip line is formed between the upper and lower layer dielectric substrates and between the antenna element 27 and the parallel feeding line 32, and the earth conductor.

In this embodiment, three receiving array antennas are aligned in the horizontal direction, the number of antenna elements of the receiving array antennas 1 and 3 at both outer ends thereof which are aligned in the horizontal direction is larger than the number of antenna elements of the receiving array antenna 2 in the center which are aligned in the horizontal direction. Also, as shown in FIG. 7A, the width of the micro-strip line is changed so as to weight the receiving sensitivity of the receiving array antenna.

According to this embodiment, even if the antenna area (antenna length in the horizontal direction) of the antenna unit is increased, a short distance between the receiving antennas can be maintained, and a return of the phase difference of the receive signal can be reduced. For that reason, it is possible to provide the mobile radar and the radar antenna which has the narrow angle beam and enables the precise azimuth detection without increasing the number of parts.

Also, the micro-strip patch antenna of the single-layer dielectric substrate is exemplified in this case. However, the same effects are obtained with the planar antennas such as a multi-layer micro-strip patch antenna in which the radiation element and the feeding line are formed on the different layers, a tri-plate antenna, or a slot antenna.

Fifth Embodiment

Figure 12:
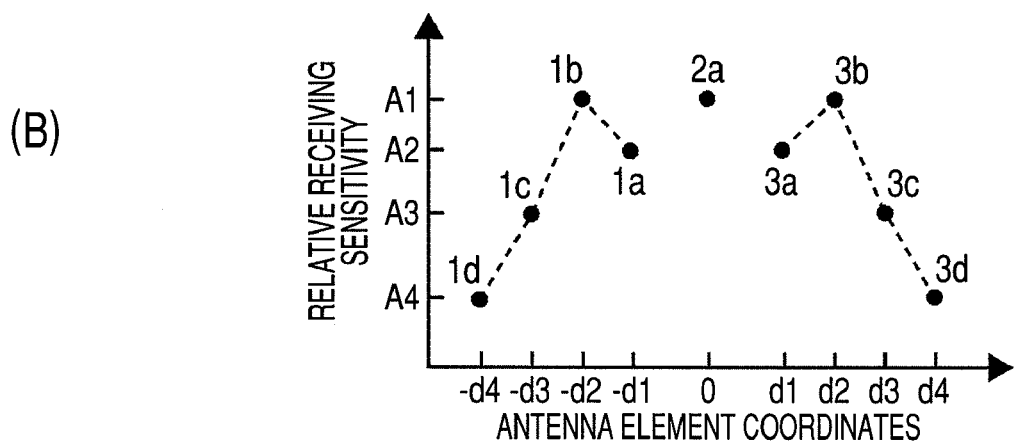
FIG. 12 is a configuration diagram showing a mobile radar according to a fifth embodiment of the present invention.
Figure 12:
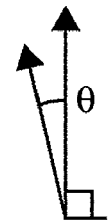
Figure 12:
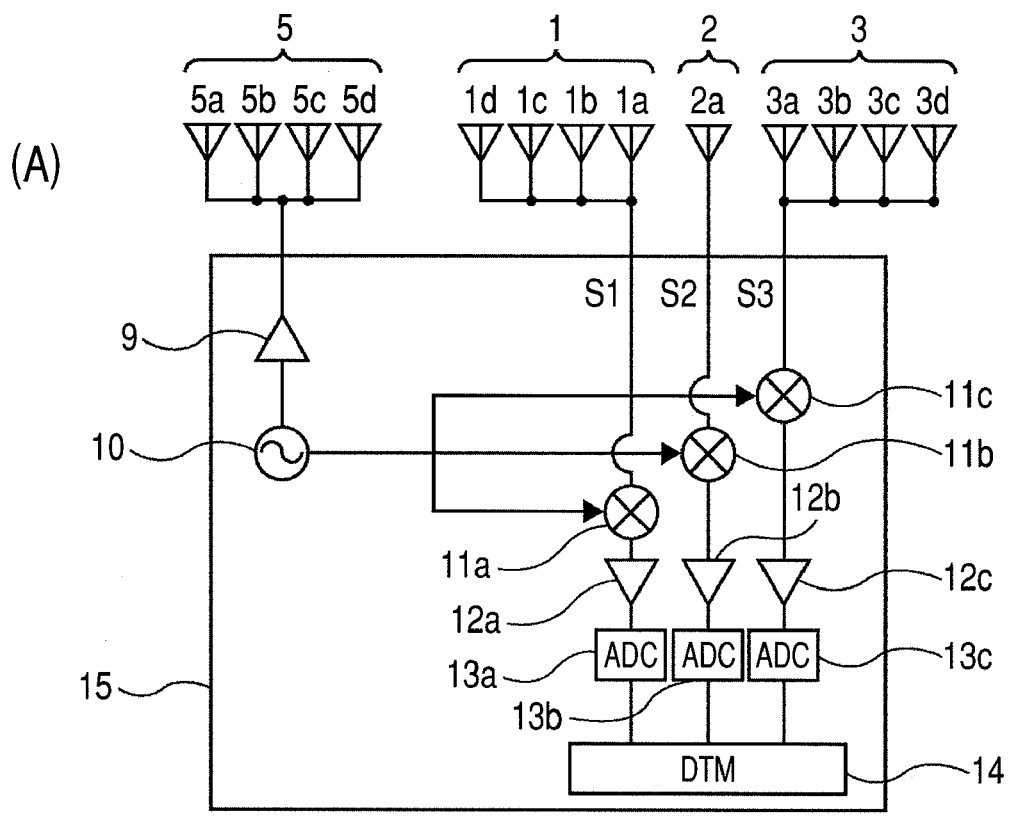
Figure 13:
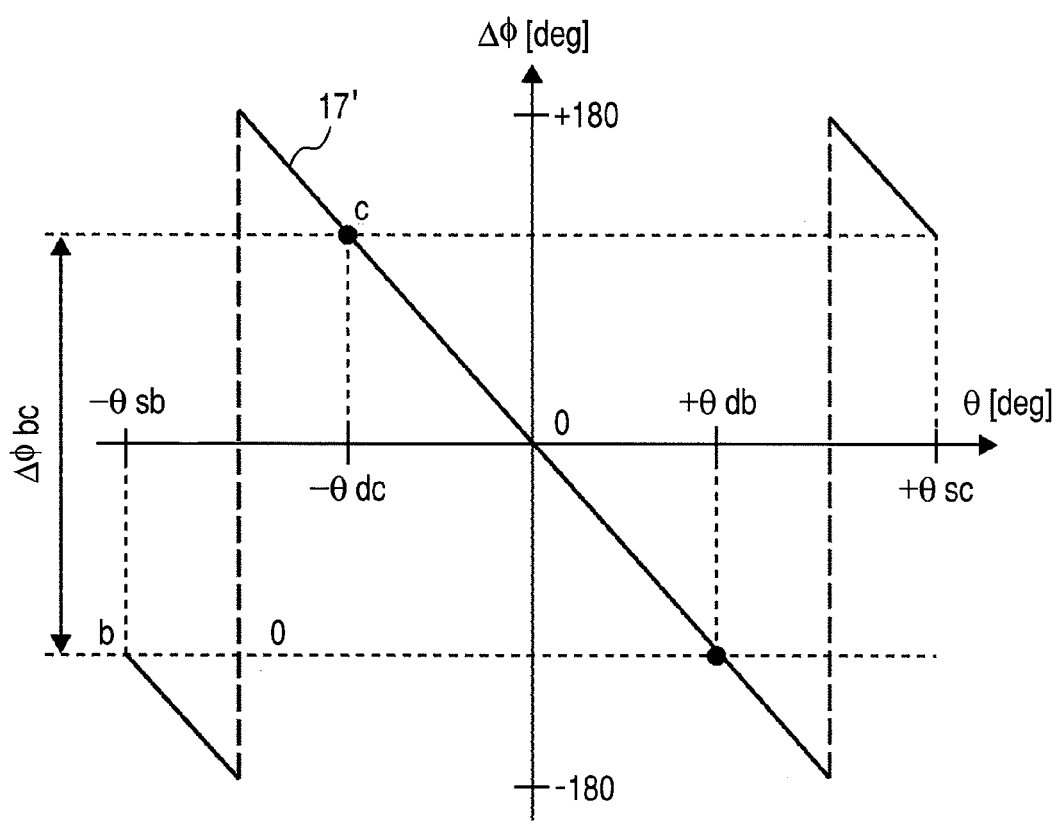
FIG. 13 is a diagram showing a phase difference characteristic based on Expression (5) in the fifth embodiment.

In the present invention, the weighting of the receiving sensitivity may not always be monotonically decreased. FIGS. 12 and 13 show an embodiment in which the weighting of the receiving sensitivity is not monotonically decreased.

FIG. 12 is a configuration diagram showing a mobile radar according to a fifth embodiment of the present invention, in which (A) is a conceptual diagram showing the configuration of a mobile radar according to a third embodiment, and (B) is a diagram showing a relationship between the antenna element coordinates and the relative receiving sensitivity of the mobile radar shown in (A).

Similarly, in this embodiment, three receiving array antennas are aligned in the horizontal direction, and the number of antenna elements of the receiving array antennas 1 and 3 at both outer ends thereof which are aligned in the horizontal direction is larger than the number of antenna elements of the receiving array antenna 2 in the center which are aligned in the horizontal direction.

As shown in (B) of FIG. 12, the weighting of the receiving sensitivity of the antenna elements 1a, 1b, 1c, and 1d of the receiving array antenna 1 is A2, A1, A3, and A4. The distances from the receiving array antenna 2 are d1, d2, d3, and d4. In this example, the weighting of the receiving sensitivity is not monotonically decreased from the inner side toward the outer side. In this embodiment, what is significant is that the antenna elements 1a and 1d of the innermost side and the outermost side hold a relationship of A2>A4. On the other hand, the weighting of the receiving sensitivity and the distance of the receiving array antenna 3 has a synthetic relationship with the receiving array antenna 1 with respect to the receiving array antenna 2 as an axis.

FIG. 13 shows a phase difference characteristic based on the above Expression (5) in the fifth embodiment. In this example, unlike the example shown in FIG. 4, because the weighting of the receiving sensitivity is not monotonically decreased, the functions of the first term, the second term, and the third term are in a range of $\theta a < \theta < 90$ [degrees], and a characteristic curve 17' representing an action $fT(\theta)$ approximates zero so that a sum of the characteristic curves 20 and 22, and a sum of the characteristic curves 21 and 23 (See FIG. 4) are inverted. However, a reduction in the number of returns is not sufficient. For that reason, data acquisition of the receive signals S1 and S3 of the receiving array antenna is limited to a range of the phase difference $\Delta\phi bc$ where there is no return, or limited to a range of $-\theta dc \leq \theta \leq +\theta db$. As a result, precise azimuth detection is enabled, for example, in a range of −20 degrees to +20 degrees, and because a slope of the curve is also large in that range, the higher azimuth resolution performance is obtained. According to this embodiment, the angle range is narrower than that in the first embodiment, but the effects conforming to the first embodiment are obtained.

Sixth Embodiment

As an embodiment of the present invention, in a case of using a planar antenna that is small in the number of elements as the antenna, it is desirable to use a dielectric lens and a radar dome in combination with the planar antenna. FIG. 14 shows a specific configuration example in which the number of elements in the vertical direction is one in the antenna according to a sixth embodiment. Similarly, in this embodiment, three receiving array antennas are aligned in the horizontal direction, and the number of antenna elements of the receiving array antennas 1 and 3 at both outer ends thereof which are aligned in the horizontal direction is larger than the number of antennal elements of the receiving array antenna 2 in the center which are aligned in the horizontal direction.

Figure 14A:
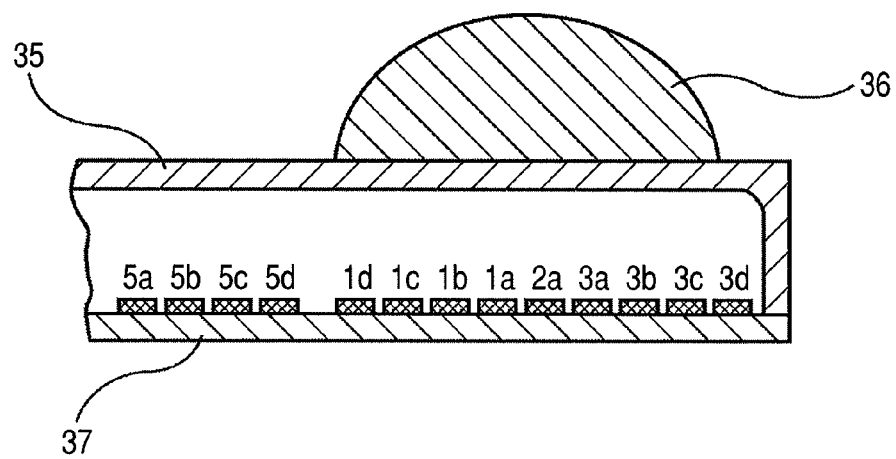
FIG. 14A is a longitudinal cross-sectional view showing a configuration concept of a mobile radar according to a sixth embodiment.
Figure 14B:
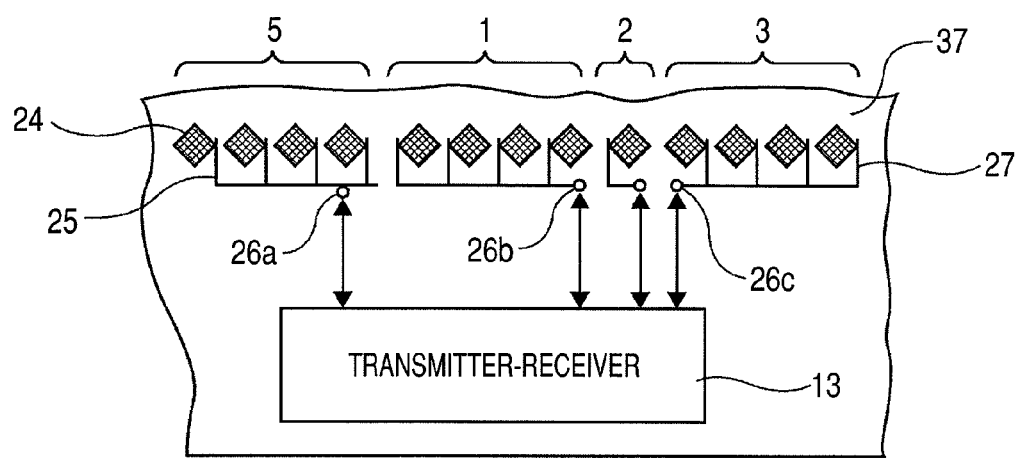
FIG. 14B is a plan view showing a configuration concept of a planar antenna in the sixth embodiment.

FIG. 14A is a longitudinal cross-sectional view showing the configuration concept of an automotive radar according to this embodiment, and FIG. 14B is a plan view showing the configuration concept of the planar antenna. The automotive radar is configured so that the transmitter-receiver unit (active circuit) such as an oscillator or a mixer and the planar antenna are integrated on the same side of the same earth plate 37 into an MMIC (monolithic microwave integrated circuit) chip. Electricity is fed to the respective antennas from the element of the active circuit within the same plane through an electric power distributor such as a micro-strip line. The MMIC chip is sealed with a resin package 35, a dielectric lens 36 is installed above the receiving antennas, and the lens and the resin package are integrated together. The weighting of the receiving sensitivity is conducted by the electric power distributor such as the micro-strip line. In particular, when the antenna is configured on the MMIC, because the area of the MMIC is proportional to the costs, the use of the antenna having the reduced number of elements is advantageous in costs.

Seventh Embodiment

Figure 15:
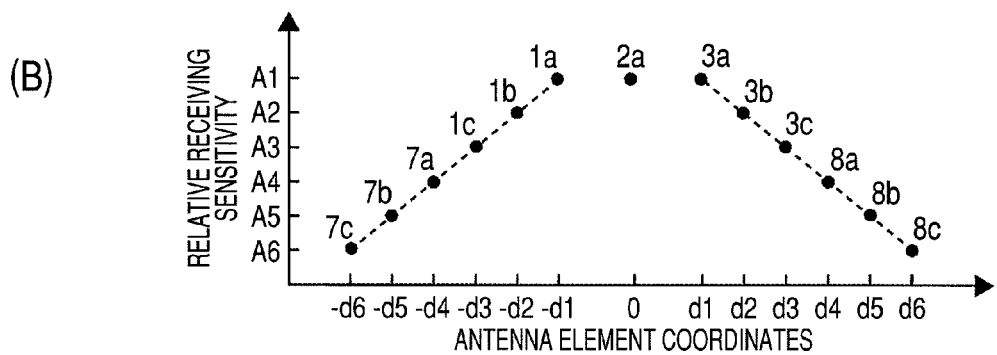
FIG. 15 is a configuration diagram showing a mobile radar according to a seventh embodiment of the present invention.
Figure 15:
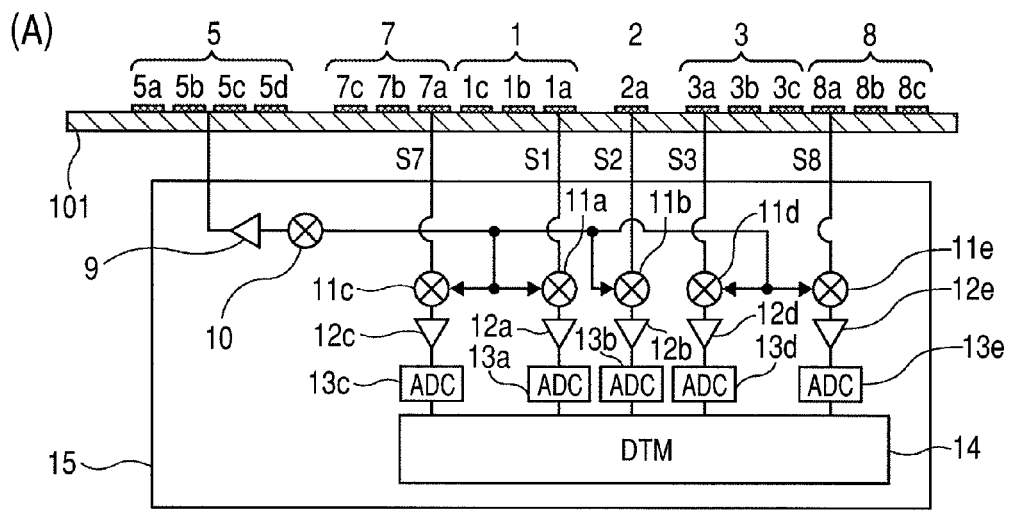
Figure 16:
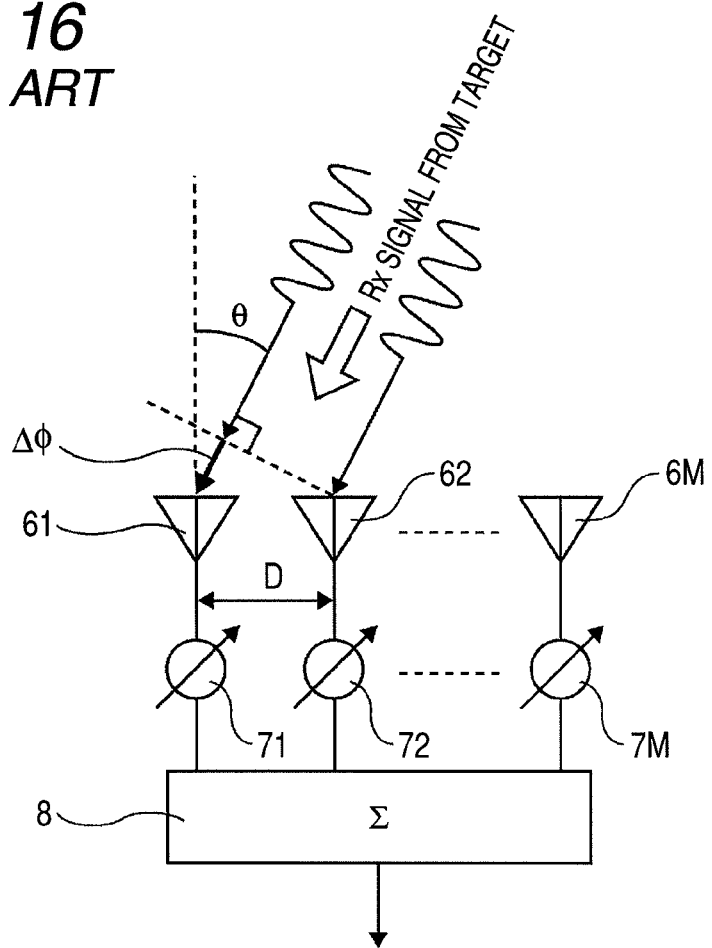
FIG. 16 is an explanatory diagram showing a conventional super-resolution method.
Figure 17:
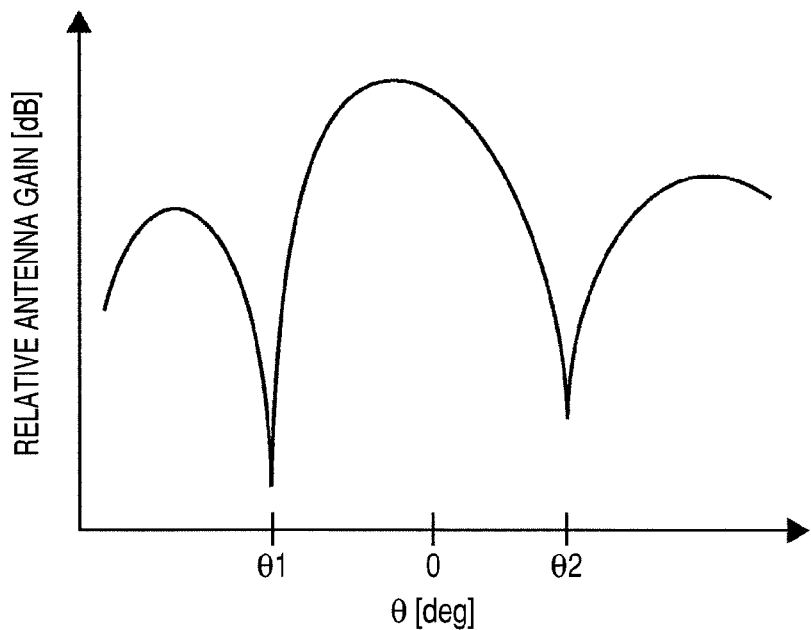
FIG. 17 is a diagram showing an example of an antenna radiation pattern when using three receiving antennas in the conventional example.
Figure 18:
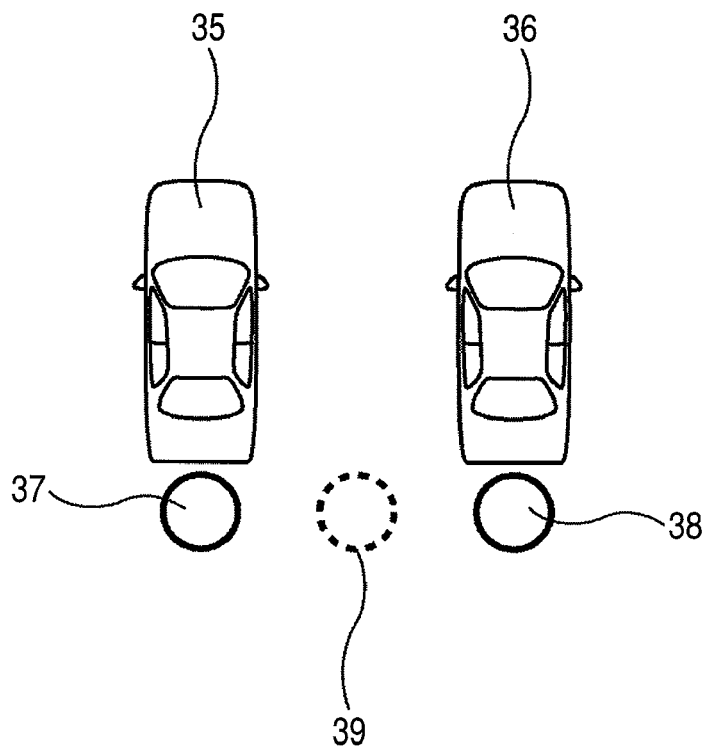
FIG. 18 is a diagram showing the arrangement of a vehicle having a radar mounted thereon, and a vehicle to be detected in the conventional example.
Figure 18:
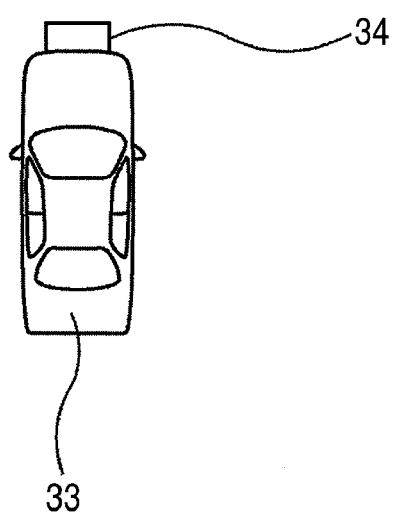
Figure 19:
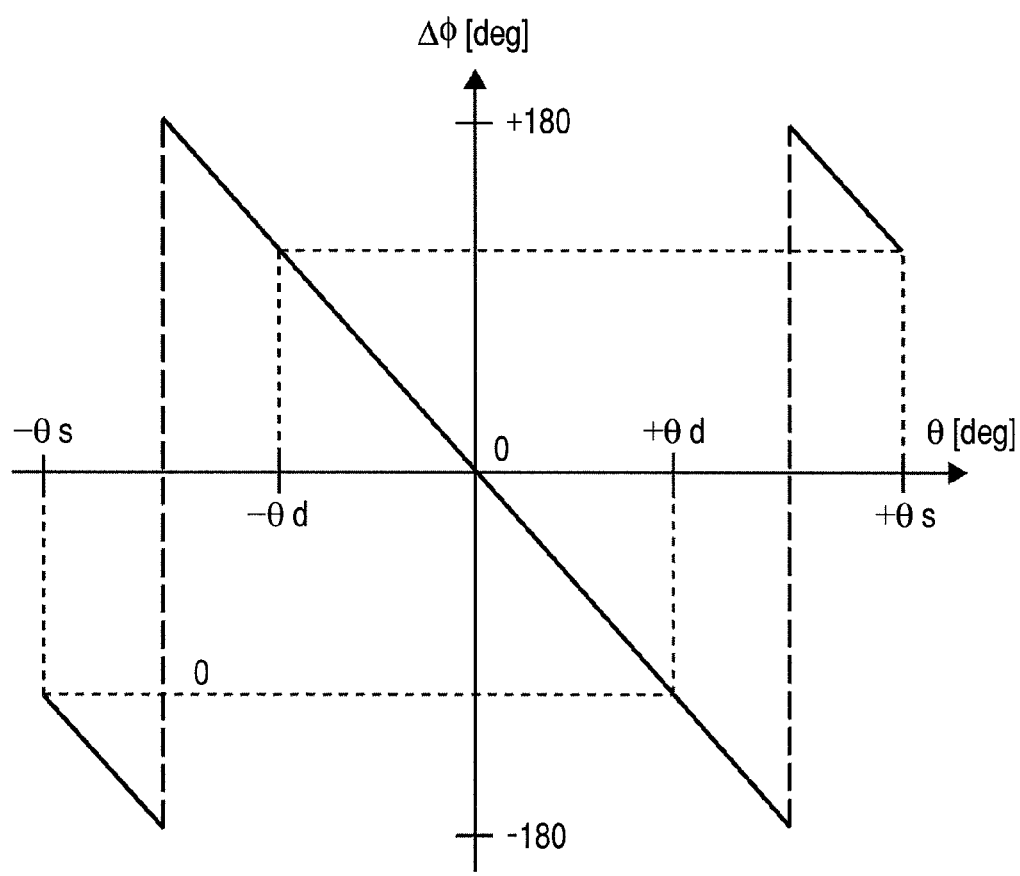
FIG. 19 is a graph showing a relationship between a phase difference and an azimuth angle obtained in the conventional example.
Figure 20:
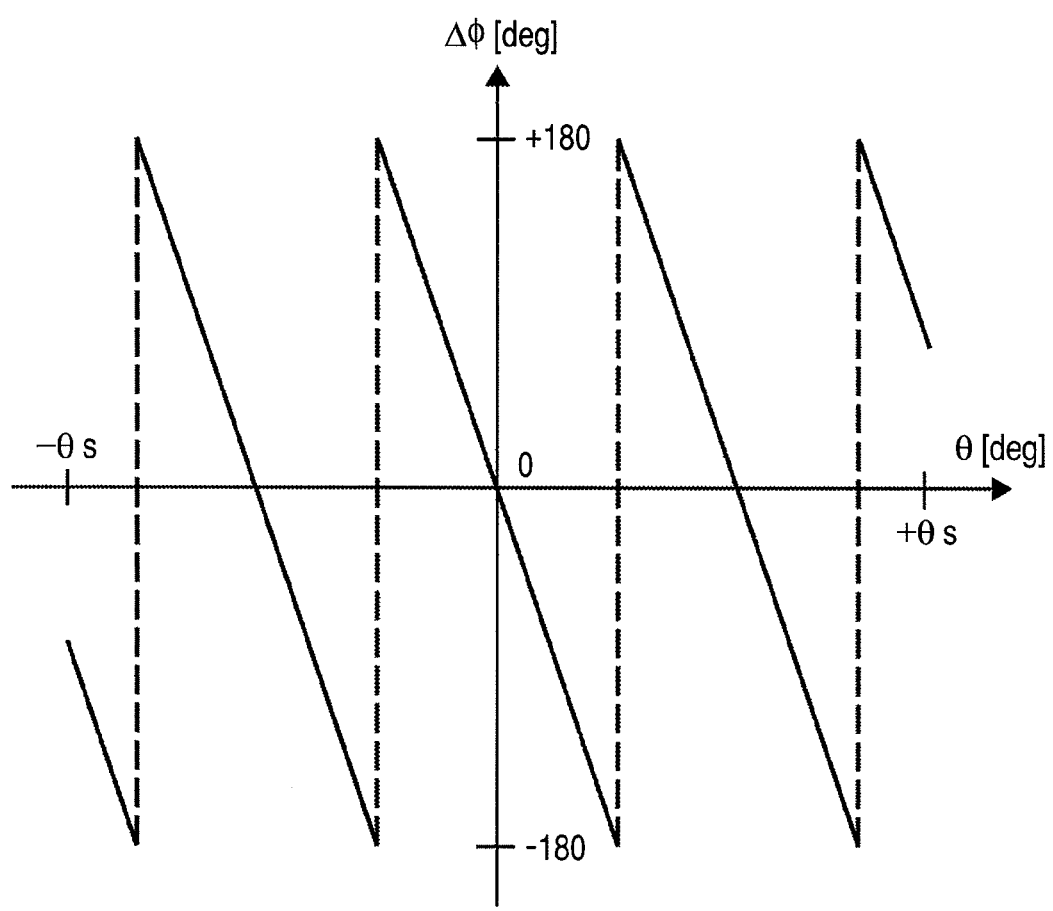
FIG. 20 is an explanatory diagram showing return caused by an increase in a distance between the receiving antennas in the conventional example.

The receiving antenna according to the present invention may be configured by plural right and left pairs of array antennas. FIG. 15 is a configuration diagram showing a mobile radar according to a seventh embodiment of the present invention. A millimeter wave signal generated by the oscillator 10 is added to the transmitting array antenna 5 through the electric power amplifier 9. The transmit signal radiated from the transmit array antenna 5 is reflected by a target, and received by the receiving array antennas 1 to 3, 7, and 8. The receiving signals S1 to S3, S7 and S8 are added to the mixers 11a to 11e, respectively, and mixed with the output signal of the oscillator 10 so as to be converted into an intermediate frequency signal. Then, the intermediate frequency signal is amplified by low noise amplifiers 12a to 12e, and input to the signal processing circuit 14 through the A/D converters 13a to 13e.

The five transmitting array antennas 5, the five receiving array antennas 1 to 3, 7, and 8 are planar antennas, and composed of the antenna elements 5a to 5f, 1a to 1c, 2a to 2c, 3a to 3c, 7a to 7c, and 8a to 8c, respectively, and aligned on the earth plate 101 in the horizontal direction. The number of antenna elements of the receiving array antennas 7 and 8 at both outer ends thereof which are aligned in the horizontal direction is larger than the number of antennal elements of the receiving array antenna 2 in the center which are aligned in the horizontal direction. Also, the number of antenna elements of the intermediate receiving array antennas 1 and 3 at both outer ends thereof which are aligned in the horizontal direction is larger than the number of antennal elements of the receiving array antenna 2 in the center which are aligned in the horizontal direction.

The weighting of the receiving sensitivity of the antenna elements of the receiving array antennas 1 and 7 and the antenna elements of the receiving array antennas 3 and 8 is monotonically decreased from the inner side toward the outer side, and distances from the receiving array antenna 2 are d1, d2, d3, d4, d5, and d6. The weighting between the elements within the receiving array antenna is executed by the ratio of the input impedance as in the first embodiment. However, the weighting between the receiving array antennas, for example between the receiving array antenna 1 and the receiving array antenna 3, may be digitally executed within the signal processing circuit.

The above digital control can also be used as calibration means for removing interference between the receiving array antennas, or removing the unnecessary wave from the ambient environment.

Accordingly, the equivalent inter-receiving-antenna distance can be maintained to be small, and the phase between the antenna elements is cancelled, thereby enabling the return of the phase difference characteristic obtained by the synthesis of the plural receiving array antennas to be reduced. Also, a simultaneous equation of those phase difference characteristics is solved, thereby making it possible to improve the azimuth precision. Since the phase difference characteristic due to the receiving array antenna 1 and the receiving array antenna 7 generates the return, the individual simultaneous equations contain an error. However, the number of simultaneous equations is increased to enhance the precision, thereby contributing to an improvement in the azimuth precision.

Also, in this embodiment, the receiving array antennas 1 to 3, 7, and 8 have been described with three elements, respectively. However, the same effect is obtained with the provision of plural elements. The effect of a reduction in the number of returns is larger as the number of elements is larger. Also, the number of elements of the receiving array antennas 1, 3 and the number of elements of the receiving array antennas 7, 8 are made different from each other, thereby obtaining the diverse phase difference characteristic. For example, when the number of elements of the receiving array antennas 1 and 3 is reduced more than that of the receiving array antennas 7 and 8, the wide-range azimuth angle detection can be conducted by the receiving array antennas 7 and 8, and the high-precision azimuth detection can be conducted by the synthesis of the receiving array antennas 1 and 7, and the synthesis of the receiving array antennas 3 and 8.

It is not always necessary that the weighting of the receiving sensitivity of the antennas in the antenna element group is monotonically decreased from the inner side toward the outer side. When at least the innermost and outermost antenna elements satisfy a relationship of A1>A6, and the characteristic curve representing fT(θ) through Expression (7) approximates zero or about zero as a whole, even if the weighting of the receiving sensitivity has a relationship reverse to the above in a part of the antenna element group, there arises no problem.

According to this embodiment having plural receiving array antennas, the wide azimuth detection range is obtained by a pair of receiving array antennas, and higher-precision azimuth detection can be executed by a pair of receiving array antennas other than the above one.

What is claimed is:

1. A mobile radar comprising:
   a planar antenna; and
   a transmitter-receiver unit,
   wherein the planar antenna includes at least one transmitting array antenna and three or more receiving array antennas,
   wherein the three or more receiving array antennas are aligned in a horizontal direction,
   wherein the receiving array antennas has the number of antenna elements of the receiving array antennas positioned at both outer ends thereof which are aligned in the horizontal direction which is larger than the number of antenna elements of the other at least one receiving array antenna positioned at inner side in the horizontal direction,
   wherein an outermost antenna element is smaller than an innermost antenna element in the weighting of the receiving sensitivity of the receiving antennas located at both outer ends thereof in the horizontal direction, and
   wherein the respective receive signals obtained by reflecting a radio wave transmitted from the transmitting array antenna by at least one obstacle and received by the respective receiving array antennas are synthesized in directivity after being weighted in the amplitude/phase, and an azimuth angle being null or low sensitivity is scanned to specify azimuth orientation of the at least one obstacle.

2. The mobile radar according to claim 1,
   wherein the weighting of the receiving sensitivity of the receiving array antennas at the both outer ends in the horizontal direction is monotonically decreased from the innermost antennal element to the outermost antenna element.

3. The mobile radar according to claim 1,
   wherein an odd number of receiving array antennas are aligned in the horizontal direction, and
   wherein when the receiving array antennas are divided into two groups of right side and left side with a receiving array antenna located in the center as a boundary, the outermost antenna element is smaller than the innermost antenna element in the weighting of a receiving sensitivity of the receiving array antennas located at both outer ends thereof in the horizontal direction.

4. The mobile radar according to claim 1,
   wherein an even number of the receiving array antennas are aligned in the horizontal direction, and
   wherein when the receiving array antennas are divided into two groups of right side and left side with a boundary provided between two receiving array antennas located on a center side thereof, the outermost antenna element is smaller than the innermost antenna element in the weighting of a receiving sensitivity of the respective groups in the horizontal direction.

5. The mobile radar according to claim 4,
   wherein the weighting of the receiving sensitivity of the respective groups in the horizontal direction is monotonically decreased from the innermost antennal element to the outermost antenna element.

6. The mobile radar according to claim 1,
   wherein the weighting of the receiving sensitivity of the receiving array antennas is conducted by an electric power distributor configured by a transmission line on the same dielectric substrate as the receiving array antennas.

7. The mobile radar according to claim 6,
   wherein each of the antenna elements includes a plurality of patch elements formed on a dielectric substrate, and a feed micro-strip line connected to the respective patch elements, and
   wherein the weighting of the receiving sensitivity of the receiving array antennas is conducted by a difference in a width of the micro-strip line corresponding to the respective patch elements.

8. The mobile radar according to claim 1,
   wherein the respective antenna elements are configured as an element line in which the antenna elements are arrayed in a vertical direction on a common dielectric substrate.

9. The mobile radar according to claim 1,
wherein the weighting of the receiving sensitivity of the receiving array antennas is conducted by a difference in a planar size between the antenna elements.

10. The mobile radar according to claim 1,
wherein the number of antenna elements that are grouped according to directivity synthesis of the receive signals from the plurality of receiving array antennas by a transmitter-receiver unit is selectable, and
wherein the number of grouped antenna elements is configured such that the number of elements in a group including the antenna elements of the receiving array antennas located at both outer ends thereof which are arranged in the horizontal direction is larger than the number of elements in a group including the antenna elements of the other receiving array antennas positioned at inner side in the horizontal direction.

11. A mobile radar comprising:
a planar antenna disposed on a common ground plate; and
a transmitter-receiver unit disposed on the common ground plate,
wherein the planar antenna includes at least one transmitting array antenna, and a plurality of receiving array antennas,
wherein each of the receiving antennas includes three or more antenna elements aligned in a horizontal direction,
wherein the receiving array antennas are configured such that the number of antenna elements of the receiving array antennas located at both outer ends thereof which are arranged in the horizontal direction is larger than the number of antenna elements of the other receiving array antennas positioned at inner side in the horizontal direction, and
wherein at least one pair of the receiving array antennas is configured such that an outermost antenna element is smaller than an innermost antenna element in the weighting of the receiving sensitivity in the horizontal direction.

12. The mobile radar according to claim 11,
wherein the planar antenna is disposed on one surface of the ground plate, and the transmitter-receiver unit is disposed on another surface thereof, and
wherein the weighting of the receiving sensitivity of the receiving array antennas is conducted by an electric power distributor configured by a transmission line on the same dielectric substrate as the receiving array antennas.

13. The mobile radar according to claim 11,
wherein the planar antenna and the transmitter-receiver unit are integrated on the same substrate on the same surface of the ground plate into a single or a plurality of MMIC chips, and
wherein the weighting of the receiving sensitivity is conducted by an electric power distribution micro-strip line.

14. A planar antenna comprising:
at least one transmitting array antenna; and
three or more receiving array antennas,
wherein the receiving array antennas are arranged on a common dielectric substrate in a horizontal direction,
wherein each of the receiving array antennas is configured as an element train in which a plurality of antenna elements are arrayed in a vertical direction,
wherein the number of antenna elements of the receiving array antennas at both outer ends thereof which are arranged in a horizontal direction is larger than the number of antenna elements of the other at least one receiving array antenna positioned at inner side in the horizontal direction, and
wherein an outermost antenna element is smaller than an innermost antenna element in the weighting of the receiving sensitivity of the receiving array antennas located at the both outer ends.

15. The planar antenna according to claim 14,
wherein the weighting of the receiving sensitivity of the receiving array antennas at the both outer ends in the horizontal direction is monotonically decreased from the innermost antennal element to the outermost antenna element.

16. The planar antenna according to claim 14,
wherein an odd number of receiving array antennas are aligned in the horizontal direction, and
wherein the outermost antenna element is smaller than the innermost antenna element in the weighting of the receiving sensitivity of the receiving array antennas at both outer ends thereof in the horizontal direction.

17. The planar antenna according to claim 14,
wherein an even number of the receiving array antennas are aligned in the horizontal direction, and
wherein when the receiving array antennas are divided into two groups of right side and left side with a boundary provided between two receiving array antennas located on a center side thereof, the outermost antenna element is smaller than the innermost antenna element in the weighting of a receiving sensitivity of the respective groups in the horizontal direction.

18. The planar antenna according to claim 14,
wherein the weighting of the receiving sensitivity of the receiving array antennas is conducted by an electric power distributor configured by a transmission line on the same dielectric substrate as the receiving array antennas.

19. The planar antenna according to claim 14,
wherein each of the antenna elements includes a plurality of patch elements formed on a dielectric substrate, and a feed micro-strip line connected to the respective patch elements, and
wherein the weighting of the receiving sensitivity of the receiving array antennas is conducted by a difference in a width of the micro-strip line corresponding to the respective patch elements.

20. The planar antenna according to claim 14,
wherein the weighting of the receiving sensitivity of the receiving array antennas is conducted by a difference in a planar size between the antenna elements.

* * * * *